US007865394B1

(12) United States Patent  (10) Patent No.: US 7,865,394 B1
Calloway et al.  (45) Date of Patent: Jan. 4, 2011

(54) MULTIMEDIA MESSAGING METHOD AND SYSTEM

(75) Inventors: Kevin Calloway, Los Angeles, CA (US); Jason McNamara, Santa Monica, CA (US); Ergon Copeland, Woodland Hills, CA (US); Anthony Franco, Corona, CA (US); Zvulun Halfon, Woodland Hills, CA (US); Scott Johnson, San Pedro, CA (US); Ronald Kewish, Simi Valley, CA (US); Richard Wilson, San Dimas, CA (US)

(73) Assignee: Alterian, LLC, Chicago, IL (US)

( * ) Notice: Subject to any disclaimer, the term of this patent is extended or adjusted under 35 U.S.C. 154(b) by 2082 days.

(21) Appl. No.: 09/708,235

(22) Filed: Nov. 7, 2000
(Under 37 CFR 1.47)

Related U.S. Application Data

(60) Provisional application No. 60/197,759, filed on Apr. 17, 2000.

(51) Int. Cl.
*G06Q 30/00* (2006.01)
(52) U.S. Cl. ............... 705/14.4; 705/14.43; 705/14.59; 705/14.66; 705/14.67; 379/88.05; 370/252
(58) Field of Classification Search .................. 705/10, 705/14, 14.4, 14.43, 14.59, 14.66, 14.67; 379/88.06, 88.05; 370/252
See application file for complete search history.

(56) References Cited

U.S. PATENT DOCUMENTS

| 5,590,282 | A | | 12/1996 | Clynes |
| 5,773,741 | A | | 6/1998 | Eller et al. |
| 5,886,274 | A | | 3/1999 | Jungleib |
| 6,067,348 | A | | 5/2000 | Hibbeler |
| 6,222,826 | B1 | * | 4/2001 | Faynberg et al. ............ 370/252 |
| 6,636,965 | B1 | * | 10/2003 | Beyda et al. ................ 713/152 |
| 6,725,381 | B1 | * | 4/2004 | Smith et al. .................... 726/4 |

* cited by examiner

*Primary Examiner*—Raquel Alvarez
(74) *Attorney, Agent, or Firm*—Law Offices of David L. Hoffman

(57) ABSTRACT

A system and method for the distribution of individualized multimedia content over a network to a number of recipients. The system assembles a message containing multimedia content which is extracted from a media content repository in response to information about the intended recipient. The multimedia content is thereby individualized for the particular recipient; for example an individualized audio greeting containing with audio annunciation of the recipient's name within multimedia message. Multimedia elements may be variously combined within an individualized message containing audio, graphics, text, animations, video, and/or ecommerce/transaction primitives. The system provides the ability to develop and manage the multimedia content repository, control the distribution of the individualized multimedia content, and report on system activity. By way of example and not of limitation, the individualized content may be delivered through an email to the recipient as part of an email campaign, as a multimedia message through other networks, or as graphic and text output on a printer.

71 Claims, 14 Drawing Sheets

| Solution | Purpose | Optional Features | Media Files | Individualization Elements (Max) | Data Treatment |
|---|---|---|---|---|---|
| Promotional Commercial | Branding, Promotional, Traffic | • Interactivity<br>• Word-Of-Mouth<br>• Dynamic Coupon | Delivery:<br>  HTML & Flash<br>Maxlength: 30 Sec<br>File Size: 200 K | Graphics/Text...<br>/Audio Elements: 3<br>Dynamic Links: 5 | Min Recipients: 250K<br>Data Lists: 5<br>List Segments: 5 |
| Direct Sales Commercial | Sales of Single Item or Offer | • Interactivity<br>• Word-Of-Mouth<br>• Dynamic Coupon<br>• Advanced Tracking | Delivery:<br>  HTML & Flash<br>Maxlength: 30 Sec<br>File Size: 200 K | Graphics/Text...<br>/Audio Elements: 3<br>Dynamic Links: 5<br>Merchandise Items*: 1 | Min Recipients: 50K<br>Data Lists: 5<br>List Segments: 5 |
| Direct Sales Catalog | Sales of Multiple Items | • Interactivity<br>• Word-Of-Mouth<br>• Dynamic Coupon<br>• Advanced Tracking | Delivery:<br>  HTML & Flash<br>Maxlength: 30 Sec<br>File Size: 500 K | Graphics/Text...<br>/Audio Elements: 3<br>Dynamic Links: 5<br>Merchandise Items*: 10 | Min Recipients: 50K<br>Data Lists: 10<br>List Segments: 10 |
| Dynamic Newsletter | Branding and Customer Relationship Management, Advertising Sales | • Interactivity<br>• Word-Of-Mouth<br>• Dynamic Coupon | Delivery:<br>  HTML & Flash<br>Maxlength: 30 Sec<br>File Size: 200 K | Graphics/Text...<br>/Audio Elements: 3<br>Dynamic Links: 15 | Min Recipients: 250K<br>Data Lists: 5<br>List Segments: 5 |
| ASP Demo Hosting | Sales and Promotional Tool | • Preview<br>• Forward<br>• Tracking and Reporting | Delivery:<br>  HTML & Flash<br>Maxlength: 30 Sec<br>File Size: 200 K | Graphics/Text...<br>/Audio Elements: 5<br>Dynamic Links: 15 | Min Recipients: None<br>Data Lists: 5<br>List Segments: 5 |

FIG. 5

MULTIMEDIA MESSAGING METHOD AND SYSTEM

CROSS-REFERENCE TO RELATED APPLICATIONS

This application claims priority from U.S. provisional application Ser. No. 60/197,759 filed on Apr. 17, 2000.

STATEMENT REGARDING FEDERALLY SPONSORED RESEARCH OR DEVELOPMENT

Not Applicable

REFERENCE TO A MICROFICHE APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyrights has no objection to the facsimile reproduction by anyone of the patent document or the patent disclosure, as it appears in the United States Patent and Trademark Office file or records, but otherwise reserves all copyrights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention pertains generally to the individualization of multimedia content and more particularly to the automated creation and distribution of individualized multimedia messages and content over a network.

2. Description of the Background Art

The efficiency with which business and personal communications may be exchanged over computer networks is redefining traditional communication practices. Networks, such as the world wide web (internet), are being used increasingly for both communication and advertising. In addition, numerous other networks are becoming increasingly used for digital data delivery, such as satellite networks, interactive TV, cable networks, and wireless device networks.

Traditionally, the delivery of communications and advertising over networks has been accomplished through web sites and by the delivery of emails. However, the use of web sites and email as an advertising and communications medium has had numerous drawbacks. Advertising on web sites requires that prospective clients be "driven" to the site by traditional advertising, such as direct mail. As a "push" technology, the use of email for advertising has had some success. Typical email campaigns generate a series of emails containing text or fixed multimedia elements which together constitute an offer. The ability to merge text fields from a list has long been utilized for sending business correspondence and offers. However, only a minor amount of user involvement and relevance is provided by text fields and it has become increasingly difficult to get and hold the attention of a recipient with a text-only message. The drawbacks of using text-only advertising have long been recognized, and as a result conventional advertising, such as direct mail, now generously utilizes graphical elements for grabbing the recipient's attention. Offers have been augmented by the addition of fixed multimedia elements which include graphics, animations, and/or audio, to engender recipient interest and action. Although current techniques using fixed graphics within email advertising, and print advertising, attempt to increase user involvement, the resultant messages are often still unable to attract and maintain user attention.

Text-based email marketing, therefore, is losing effectiveness as a medium for attracting and retaining the attention of a customer who in today's market is being bombarded with numerous unengaging offers. A leading market research company, Jupiter Communications, which specializes in internet commerce, estimates that by the year 2005 each email recipient within the United States will receive an average of 1,600 commercial emails annually. During that period, commercial email spending is predicted to reach $7.3 billion.

Therefore, a need exists for methods of increasing user involvement with content which is distributed over a network. The present invention satisfies that need, as well as others, and overcomes the deficiencies of previously developed solutions.

BRIEF SUMMARY OF THE INVENTION

The present invention provides methods for creating and distributing individualized multimedia content over a network. The multimedia messaging system provides a marketing tool for creating and deploying deeply relevant messages for boosting response, click-through and conversion levels, so that marketers may realize increased ad returns.

By "individualizing" content, a sender is able to integrate specific information associated with a particular recipient into a multimedia message for that recipient. An example of multimedia, for example, could constitute the use of animations and voiceovers. The term "individualizing" is used within the present invention instead of "personalization" which often refers to fixed messages being sent to subgroups of recipients, such as the elderly as a subgroup within a list of sports enthusiasts. The multimedia messaging system and method of the present invention, may hereafter be referred to for the sake of simplicity as "system". The system marries the specificity of customer database information—such as name, hometown, or purchase history—with the power of streaming rich media to deliver a relevant and engaging message uniquely targeted to each specific recipient. The multimedia content directed to the recipient may include various forms of streaming rich media, including: animation, voice narration, graphics, pictures, video, music, sound effects, and ecommerce/interactive mechanisms. The use of individualized multimedia content increases recipient involvement beyond that achieved using "canned" (fixed) multimedia content.

The system integrates recipient-specific customer database information into streaming and non-streaming audio and video creative content. It will be appreciated that although streaming media is preferred, the system can utilized with non-streaming media. The customer specific information used to drive the customization may be extracted from client databases, or alternately from third party databases. One aspect of the invention involves the deployment of individualized multimedia content as messages within an advertising campaign that targets and delivers an individualized email message to each recipient. For example, an individualized email may be created that utilizes individualized text and audio; text, audio, and graphics; or text, audio, graphics, and ecommerce/interactive mechanisms. In addition, the content may be deployed to various network-centric media such as wireless WAP enabled devices, interactive TV, and even to printed media. The aforementioned examples being but a few of the numerous combinations which may be realized for digital content distribution over a network. The terms "campaign", or "advertising campaign" in reference to the system is often used herein for making reference to the action of sending individualized messages, however, the term can refer to the use of the system for sending any form of individualized messages to a single person, or any sized list of individuals. Examples of system use for individuals or small lists include applications such as newsletters, customer service responses, order confirmations, invoices, and so forth.

In creating individualized audio, graphic, or animation content; the system combines media elements to create each of the individualized versions of a message. Typically, the message being delivered comprises both fixed content and individualized content, however, the message may be wholly comprised of individualized content. During the campaign, the fixed content "message" to be delivered is customized with data about each of the intended recipients, thus creating individualized multimedia content which is delivered to each specific recipient. While the ad campaign runs, the message sponsors are preferably afforded the ability to measure results in real time. The multimedia messaging system may be utilized to provide solutions for deploying various individualized content, including: dynamic newsletters, printed material, direct sales catalogs, customer service responses, direct sales commercials, and various additional forms of promotional media.

The system may be deployed in various configurations depending on the business model which is adopted. In a preferred "client access" model, the company operating the multimedia messaging system, hereinafter referred to as "the company", provides the "client" with access to the system for the development of a multimedia campaign. An example of the client access model is shown in FIG. 1. It will be appreciated that the client within the "client access" model may be provided with ancillary applications, such as a custom browser, to facilitate access and/or provide additional features and functions.

In another preferred deployment of the multimedia messaging system, the client is provided with software, or software bundled with specific hardware elements, that may be installed at their own site from which to develop and deploy campaigns. This "client deployed" model is illustrated in FIG. 2 and it allows the client/advertiser to develop and deploy campaigns using their own equipment, or that of third parties if desired.

The preferred method of deploying the individualized messages utilizes a standard email template containing a rich media message and a Macromedia flash file which is unique for that particular recipient. The unique message begins streaming and playing automatically when the message is highlighted in the recipient's email inbox. Alternatively, other methods may be utilized for deploying the individualized messages. The system adapts the message format to the delivery mechanisms which are available to the recipient through their email service provider or server. Some email service providers do not support HTML, for recipients with this service, the message includes a static graphic and a clickable link. When the recipient clicks on the link, a browser opens and the message unique to that recipient plays. A third type of email service provider allows neither HTML or attached executables. For recipients with this service, a simple text message and a clickable link are provided. Regardless of the deployment method, an individualized message is created for each recipient which may be sent by either the client, the company, or a third party.

The aforementioned email message distribution described the use of implicit executables and/or links which were generated for each individualized message and then embedded in the email message, however, the system also provides for generating the individualized messages directly, instead of links to individualized messages. It will be appreciated that embedded links could not be used when the system is generating printed material, and may be undesirable when distributing content to any non-interactive environment including MPEG files, and certain wireless media networks. By way of example FIG. 3 shows the generation of individualized messages within printed material, wherein individualized content, graphics in this case, are printed onto paper stock or other materials.

The recipient data for individualizing, and optionally for directing message delivery in the case of emails, is preferably extracted from one or more client databases by any of numerous methods, including ODBC and XML. Alternatively, the recipient information may be manually received from the client, remotely accessed, or derived/inferred from known elements. For example, the client may send data over the internet, as a tape, a set of disks, or as a CD-ROM. The system preferably accepts a variety of file formats including the common: *.txt, *.csv, spreadsheets formats, and any relational or non-relational database format. The recipient data is then used to individualize the media elements, which may include audio, animations, and/or video for each recipient. During an individualized campaign, each recipient on the campaign list receives, preferably in a dynamic display format, one or more messages containing the multimedia message or a link to the multimedia message. One typical form of messaging campaign involves the sending of emails to a list of recipients. The email messages are preferably configured as HTML messages, or a similar markup language, into which are attached the multimedia elements comprising the individualized messages. To support recipients unable to directly receive multimedia elements within their emails, a unique URL can be embedded within the email message to open a browser for displaying the individualized multimedia message. The unique URL is preferably activated immediately upon selecting the message, and alternatively upon opening or upon user selection of the graphic, or text, associated with the URL link. Upon link activation, a server is connected to the recipient through their browser to deliver the individualized audio-video stream to the recipient.

The preferable display format within the exemplified embodiment utilizes Macromedia's Flash™ file format (*.swf), as it provides both dynamic capability and data queries. Macromedia Flash™ is one of a number of commercially available rich media open-source formats. The associated display routines for the display format receive the output from active server pages and an XML (or similar) application which permits interactivity with the server side components, such as content and information databases. The integration of the active server pages and the XML applications within the *.swf format permit the real-time creation of variable content which is selected in real time in response to dynamic criteria, either in the form of feedback from the recipient, or a priori, based on database content and/or server-side rules.

The system is preferably deployed so that clients can easily manage their multimedia campaigns, maintain the content databases, and receive real-time reports on the status of a campaign. The multimedia elements which are to be assembled for the individualized messages may be created by the client, or by a third party. The list of recipients to which the messages are to be directed is contained within a recipient database that may be supplied by the client, or a third party.

The recipient database provides delivery information about the client, such as email address, along with various information about the recipient which may be utilized in the process of individualizing a message to that specific recipient. Considering a simple use of the inventive method; emails may be individualized with the recipient's name incorporated within a portion of the graphic, animation, and/or audio portion of the message. In order to generate these simple individualized emails, the system requires a set of multimedia elements from which messages are to be created, and a list containing at least the recipient's name and email address. It will be appreciated that in generating non-email individualized multimedia, an email address would not be required, however, some form of recipient information is required upon which customization and delivery is to be based. In an email campaign, for instance, the audio portion of a message can be individualized to voice the recipient's name as part of the message by selecting audio segments which are preferably extracted from an audio content database. Alternatively, audio (or video) content may be directly generated in response to the message parameters, such as recipient's name, since various forms of speech synthesis are available which are capable of converting text to speech. Presently, the generation of the speech segments from text is complicated by voice quality concerns, lack of inflection control, and the problems associated with blending the segments into the fixed portion of the message. Similarly, video content may be generated in response to animation scripting, and sprites, such that animation content is generated according to a script which may be varied in real-time and does not require image frames or elements. However, the preferred method for creating an individualized audio message within the present invention is by the assembly of fixed audio portions to create an individualized message. The elements may be added to the streaming media of the message based on predetermined triggers, such as database flags. In order to reduce the storage requirements, the individualized elements may be stored individually for reference to a unique URL embedded within the email which may also reference a common fixed message portion, wherein the individualized elements are combined with the fixed message portion when the unique link is activated.

It will be appreciated that the method may be utilized with individualization performed at any desired level of complexity so as to engage the attention of the recipient to which the message is directed. The system and method can provide a number of product solutions which are outlined by way of example in the table shown in FIG. 5. Following are a few additional examples of hypothetical advertising campaigns to further illustrate the capability of message individualization within the system:

Displaying a graphic of a recipient's recently purchased vehicle with the correct color and style, while tying in their name and purchasing inclinations into the accompanying audio message which includes graphics and descriptions of the available accessories that may be purchased.

Sending an automotive maintenance reminder which includes a photo of the recipient's vehicle and recent service history where it has been determined that service is due, based on elapsed time and the previous odometer reading. Included can be a customized reservation response allowing the selection of available service dates.

Displaying graphics of suggested video titles that a customer may wish to rent based upon their video rental history.

Displaying an individualized jukebox animation that allows the playing of music track excerpts from newly released albums which have been selected according to the recipient's purchase history and stated preferences.

Displaying a set of graphical service instructions tailored to the particular customer and service request as received by a customer service department.

Displaying an animation of a character within the recipients age/demographic profile engaged in an action associated with their favorite sport, such as teeing off a golf ball, and accompanied with related sports product information.

The above usage illustrations are provided by way of example, and not of limitation, as the method and system of the present invention is capable of being applied to a wide variety of current and future individualized messaging applications.

An object of the invention is to automate the creation and delivery of individualized multimedia content to recipients.

Another object of the invention is to provide an individualized message delivery system capable of delivering common rich media types.

Another object of the invention is to provide an individualized message delivery system capable of being deployed over a variety of digital networks.

Another object of the invention is to provide a system which is capable of delivering individualized content without requiring that the recipient have a particular plug-in installed within their system.

Another object of the invention is to support "on-the-fly" content changes to the underlying databases.

Another object of the invention is to provide for synchronization of the multimedia elements within an individualized message.

Another object of the invention is to provide for efficient content management of the elements necessary for creating individualized messages.

Another object of the invention is to provide for data integration between the multimedia messaging system and a client system which contains the data for driving a particular campaign.

Another object of the invention is to provide deployment flexibility, wherein aspects of the multimedia messaging system may be utilized in combination with various other systems and routines to extend performance or application utilization.

Another object of the invention is to provide architectural scalability wherein individualized messaging may be utilized within businesses of various size.

Another embodiment of the invention is to provide for the delivery of individualized multimedia forms, correspondence, notifications, announcements, newsletters, and other forms of multimedia messages directed to small lists and individuals.

Another object of the invention is to provide delivery of individualized multimedia message content via email and other interactive media.

Another object of the invention is to provide delivery of individualized multimedia email messages that are played automatically upon message selection.

Another object of the invention is to provide delivery of individualized multimedia messages via print media and other non-interactive media.

Another object of the invention is to provide a mechanism for deploying word-of-mouth advertising with recipient supplied information.

Another object of the invention is to provide email messages which are user interactive so that the user can get additional recipient specific information and may place an order.

Another object of the invention is to provide an advertising mechanism in which the offer, discount, coupon, or rebate being presented may be adjusted "on-the-fly".

Another object of the invention is to deliver the individualized content in a form that has been determined to be compatible with the browser of the recipient.

Another object of the invention is to provide real-time reporting of activity, such as click-through, and system state.

Another object of the invention is to provide a revenue collection model wherein the client may be incrementally charged only for the emails which have been opened by the recipients.

Another object of the invention is to provide a system for developing and deploying individualized multimedia content that supports various system usage levels; such that clients requiring limited usage may gain easy remote access to the system while clients that require extensive usage may install system software on their own systems.

Another object of the invention is to provide a system for developing and deploying individualized multimedia content in which a library of routines is available as part of the system to speed campaign development.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 5 is a table illustrating multimedia messaging solutions according to the present invention for various select advertising purposes.

DETAILED DESCRIPTION OF THE INVENTION

Referring more specifically to the drawings, for illustrative purposes the present invention is embodied in the apparatus generally shown in FIG. 1 through FIG. 15. It will be appreciated that the apparatus may vary as to configuration and as to details of the parts, and that the method may vary as to the specific steps and sequence, without departing from the basic concepts as disclosed herein.

1. Overview of the Architecture

Figure 1:
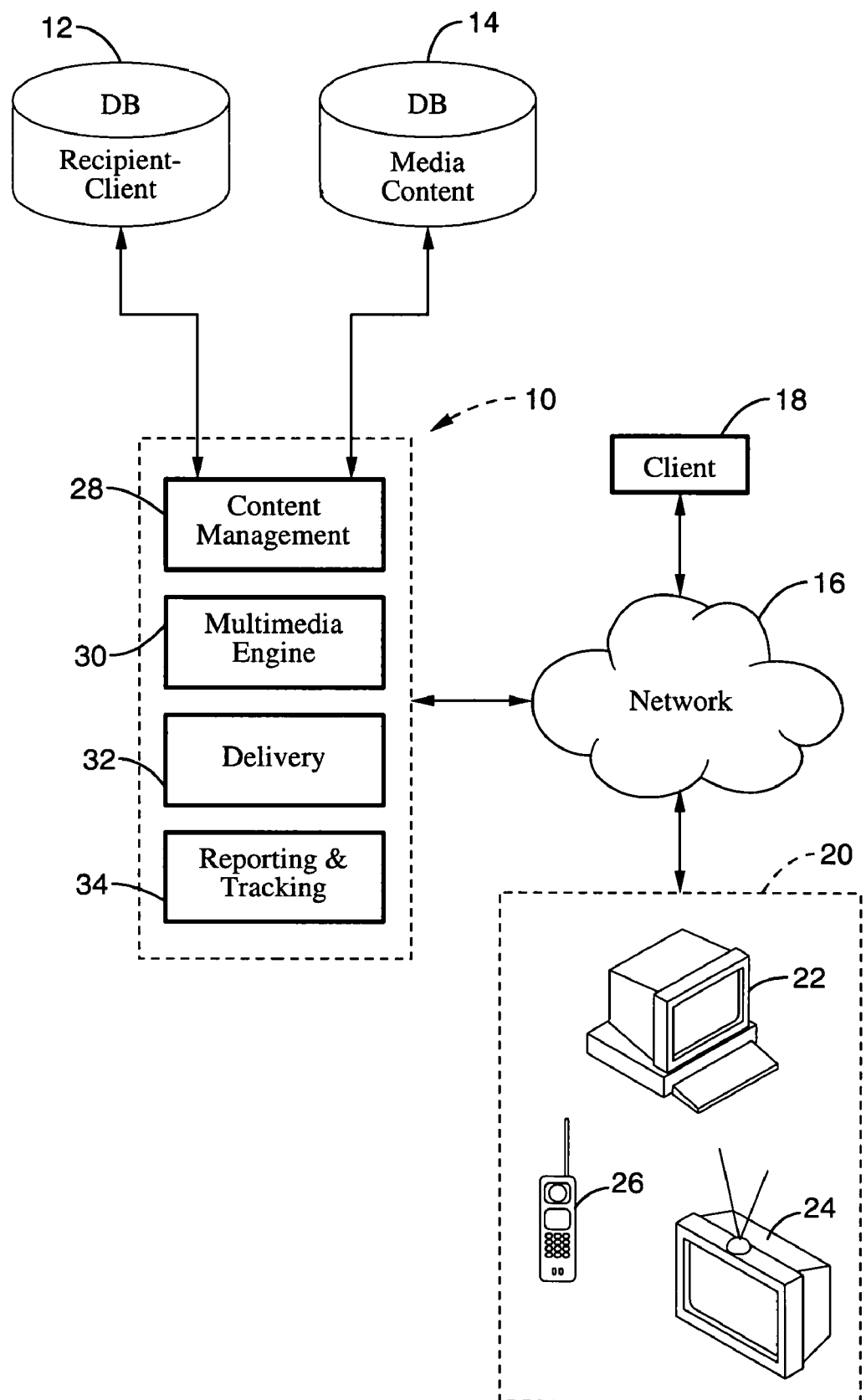
FIG. 1 is a block diagram of the individualized multimedia message creation and delivery system according to the present invention shown deployed for client access.

An embodiment of the multimedia messaging system 10 is shown in FIG. 1 for indirect client access, herein shown as network access. The embodiment of FIG. 1 is characteristic of system deployment over the internet by an application service provider (ASP). Deployment by means of an ASP is preferable for supporting clients that require only small to intermediate levels of system utilization. A repository of recipient information 12, and media content 14, are contained on electronic storage media, such as disk drives, for retaining information required by the system 10. These repositories may be contained on the same or different storage media. Additionally, it should be appreciated that recipient and content data may be obtained from a third party, or data access provided by a third party. It is, however, preferable that the data be configured to provide rapid system access so that individualized multimedia messages may be assembled without undue time delays.

The multimedia messaging system 10 is shown connected to a network 16 that connects a client 18 and a recipient 20 which is provided access to the message by any network enabled device, herein exemplified as a computer 22 (or other internet enabled device), a television 24 (interactive TV, cable network, etc.), or a wireless device 26 (cellular phone, modem equipped PDA, and so forth). For the sake of clarity, a single client 18 and single recipient 20 are shown in FIG. 1, however, it will be recognized that numerous clients may be simultaneously supported in addition to millions of individual recipients. It can be seen from FIG. 1, that the client 18 may interact over the network via the system 10 with both the recipient data 12 and the multimedia content 14.

The multimedia system of the present invention performs numerous functions in providing for the development and deployment of individualized multimedia messages to a list of recipients. These functions are preferably divided up and encapsulated into a series of subsystems. The multimedia messaging system 10 of the present invention is shown having four subsystems, a content management subsystem 28, a multimedia engine 30, a delivery subsystem 32, and a reporting and tracking subsystem 34. It will be appreciated that the division of the functions and the specific subsystems thereby created are subject to infinite variation, with the described embodiment being provided by way of example and not of limitation.

The content management subsystem 28 provides for management and administration of data within the system. The client's rich media and recipient information reside in databases which are accessible to the content management subsystem 28. Alternatively, the client can manage the file uploads outside of the content management subsystem if desired. Preferably, the content management subsystem comprises an interface with the capability to upload files, view files, catalog files, archive files, organize files, convert file formats, and clean up data. For example, the content management subsystem 28 directs uploading of assets over the network 16 from the client 18 to the recipient data repository 12 and the content repository 14.

A multimedia engine 30 is the portion of the development environment in which the content is integrated into the desired formats and deployment forms for the email campaign. Various forms of content should be available to the client, including content accessed from a library, provided by the system developer, or more typically provided by a client, or third party, for use in a specific campaign or series of campaigns. The multimedia engine 30 also preferably comprises the ability to detect recipient email features and individual browser configurations, and to provide output suitable to the chosen delivery mechanism of the client. By way of example and not of limitation, the multimedia engine comprises the following capabilities/features:

Dynamic URL generation
HTML email template builder
Multimedia code library
Rules engine
email client detection
Multimedia plug-in detection
User configuration features
Project management features The delivery subsystem 32 of the multimedia system 10 provides a digital delivery interface through a network so that an individualized message may be delivered to a recipient. It will be appreciated that numerous device types exist which are capable of receiving digital messages containing various forms of multimedia at differing levels of complexity in various formats over some form of network. It will be recognized that the individualized content being delivered may comprise any form of digital media, which includes but is not limited to multimedia emails, emails with URL links to individualized content, individualized printing, file downloads of individualized content for playing (such as prior, current and future versions of MPEG4 and MP3), and other forms of digital multimedia content.

To understand the difference between the multimedia engine 30 and the digital delivery subsystem 32, it should be appreciated that the multimedia engine 30 preferably determines the type and complexity of the media to be output for a recipient, while the digital delivery subsystem 32 executes the specific formatting and interfacing required to output the message over the medium to the recipient. The multimedia system 10 is capable of delivering individualized content over any digital network or content delivery medium once a driver appropriate to that medium is created for the digital delivery subsystem 32. By way of example and not of limitation, the digital delivery subsystem 32 provides individualized messages to recipients by way of the following.

Email networks
Intranets
WWW networks
WAP networks
Telephony networks
Wireless networks
Satellite networks
Interactive TV
Interactive radio
Interactive voice system
Off-line printing/transfer The reporting and tracking subsystem 34 provides the application service provider (ASP), system developer, integrator, system administrator, and clients with varying degrees of reporting and tracking capability according to their needs and the dictates of security. The client, for example, is provided with the capability of monitoring their ad campaign while it is in progress. In particular, the embodied system provides for monitoring a campaign in real-time and includes tracking of click-through, conversion, and additional salient campaign metrics. The reporting and tracking subsystem also measures and reports on client activities to provide information necessary for administering the system. An example of administration level reporting is the tracking of resources being utilized by clients which have a currently running campaign.

Figure 2:
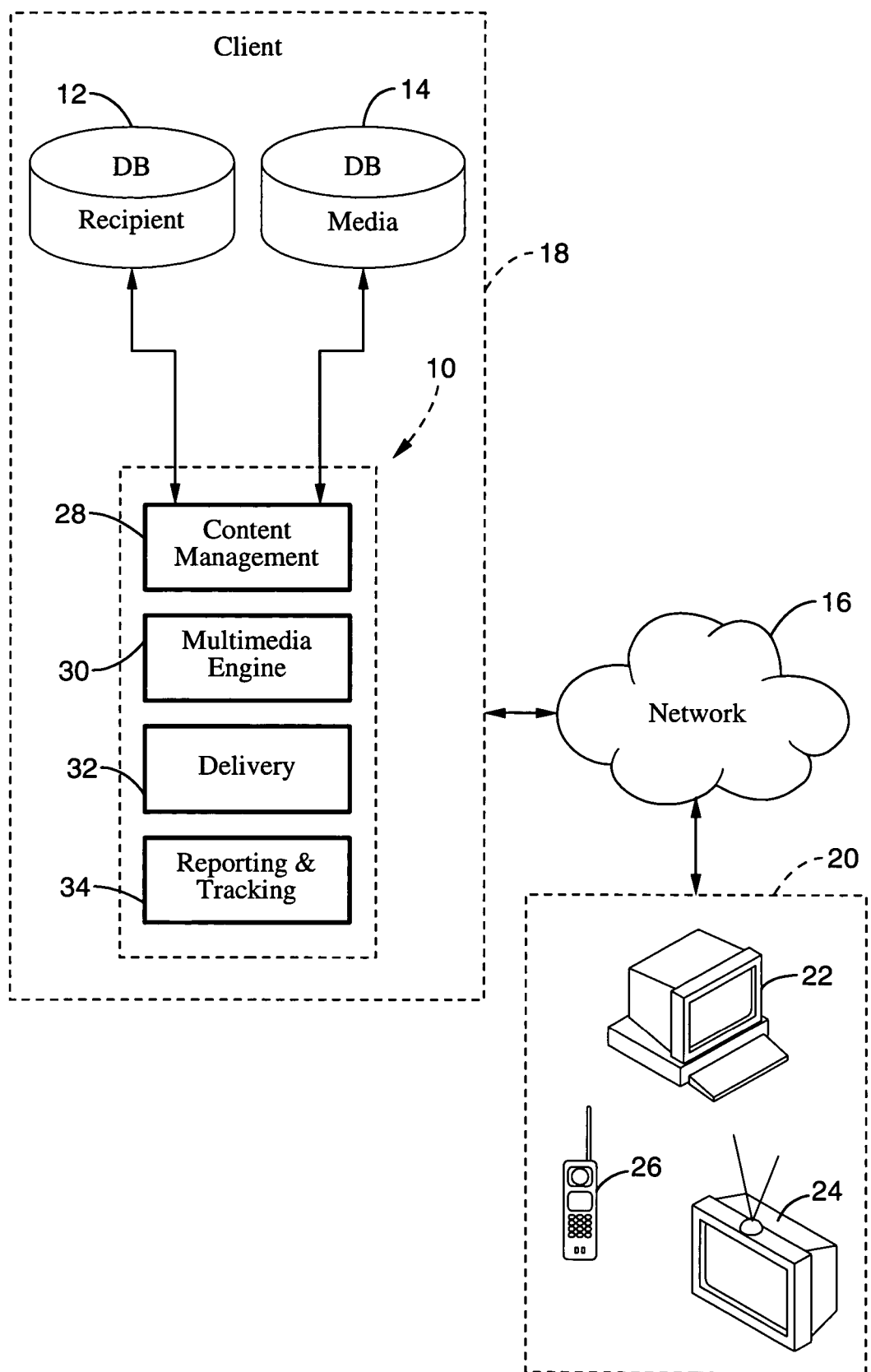
FIG. 2 is a block diagram of the individualized multimedia message creation and delivery system according to the present invention shown deployed within a client computer system.

The campaigns which deploy the individualized multimedia content over the network are developed by the aforementioned clients which access the system over the network. It should be appreciated that the system may be accessed by clients in assorted ways without departing from the present invention, and the client deployed model of FIG. 2 illustrates one such access method. The multimedia messaging system software 10 may be licensed out, sold, or otherwise provided to the client. The client is thereby conferred an ability to develop and deploy individualized multimedia campaigns from their own computer systems 18, as shown in FIG. 2. Deployment of the multimedia messaging system, by the client as reflected in FIG. 2, is generally preferable for clients that anticipate operating large, or ongoing campaigns, and/or that have security or integration issues for which they desire a tailored solution. It should be appreciated that numerous other system deployment methods and variations exist for providing the multimedia messaging capability according to the present invention to one or more clients. Furthermore, it will be appreciated that various hardware, such as accelerator boards, graphic engines and so forth, may be bundled with the system software so as to speed-up or simplify the development and deployment process.

Figure 3:
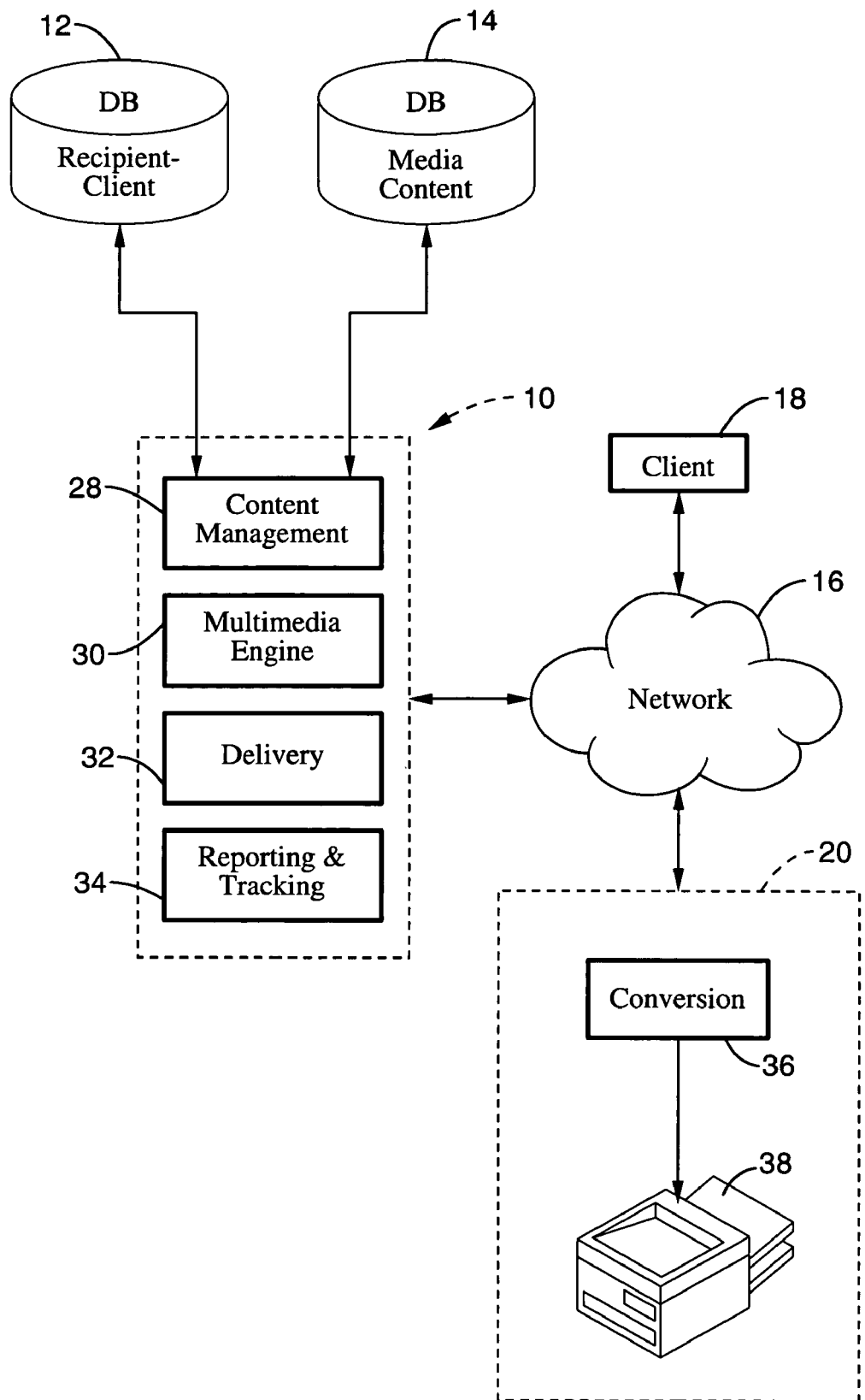
FIG. 3 is a block diagram of the individualized multimedia message creation and delivery system according to the present invention shown deployed for printing individualized graphics material.

The multimedia system of the present invention is capable of providing digital outputs to a variety of formats, as has been described. Although the majority of the formats described are related to devices capable of displaying or playing multimedia content, this is not a limitation on the practice of the invention. The digital output of the invention may be provided to "non-traditional" multimedia devices, such as WAP enabled devices, MPEG4 files, and output devices such as printers. FIG. 3 embodies the output of individualized multimedia content on a printer. The individualized multimedia files are herein shown being received over the internet 16 by a recipient mailing-service 20 for sending to the recipient. The mailing-service 20 converts the received multimedia messages through a converter 36 which provides an interface for the printer 38. The incoming individualized multimedia files, which in this instance comprise text and graphics output by the system 10, are thereby converted into a format compatible with the printer. The converter provides for the file transfer, security, file conversion, and output to a printer compatible format. Specifically, the converter 36 changes the graphic representation from the preferred Macromedia Flash™ file format of (SWF) to provide output through a printer driver which has been provided for the specific printer upon which the output is to be generated. Therefore, the individualized message content comprises graphics which are individualized for a particular recipient, i.e. specific offers, specific catalog items, specific enticement graphics, specific styles of advertising, graphical elements customized to the user (such as a photo of the recipient). Typically, the converter 36 would be a computer connected over a network which contains a conversion routine for the specific display format, such as Macromedia Flash™ file format, and which utilizes the printer drivers of the operating system over which it resides for output. The advantage of this method for creating individualized print messages should be easily appreciated since any print media, including advertisements, postcards, direct mail, brochures, newsletters, catalogs, and various forms of correspondence may all be individualized for specific recipients. The individualization of the print media increases its relevance which is expected to increase the response rate.

Figure 4:
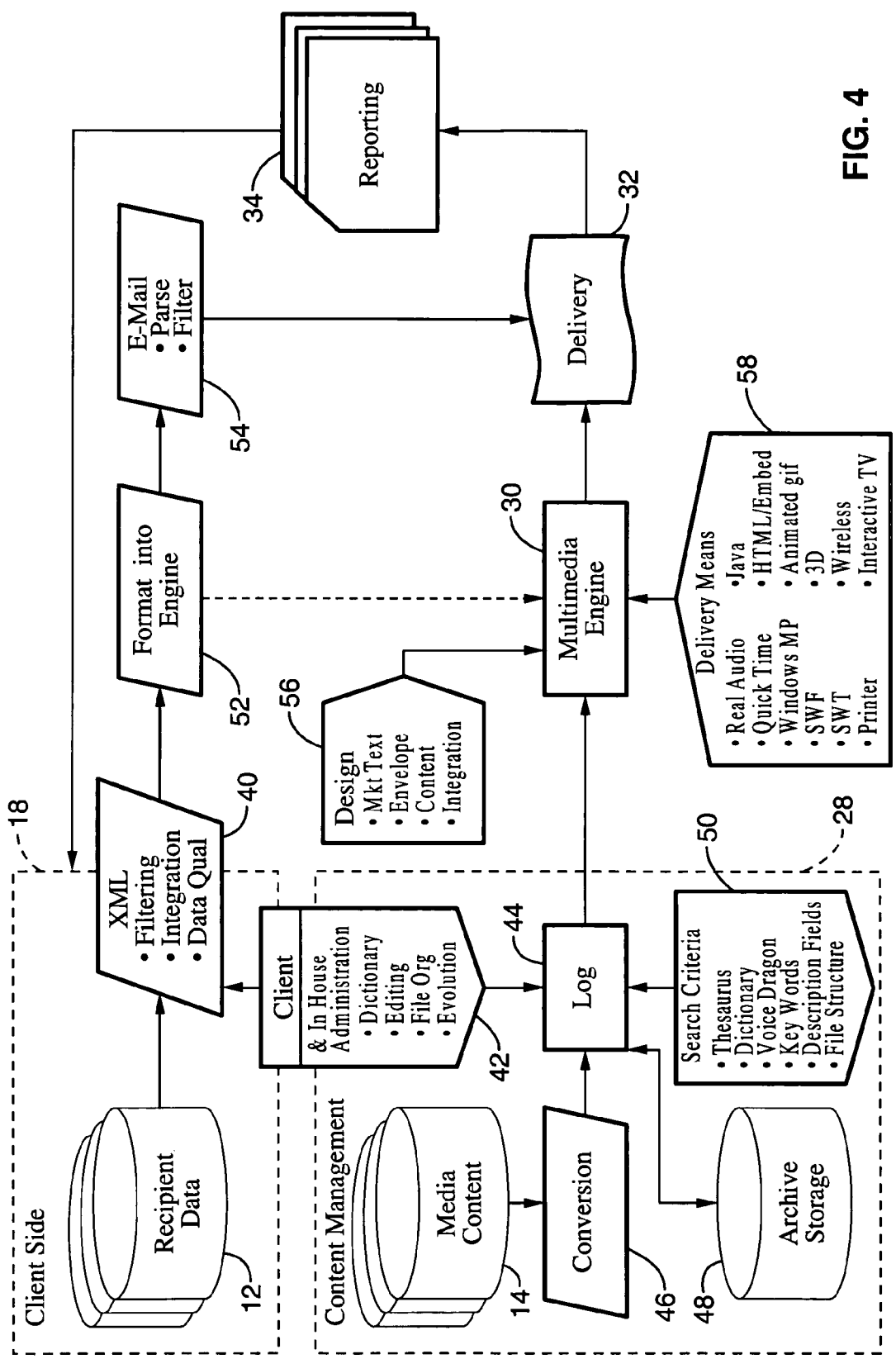
FIG. 4 is a detailed block diagram of the multimedia messaging system according to the present invention shown deployed for client access and the generation of individualized emails.

FIG. 4 is a detailed block diagram of an embodiment of the multimedia system which is configured in a "client access" model, similar to that shown in FIG. 1. The multimedia messaging system may be deployed as active server pages, for example by a client, and adapted for the output of individualized email messages containing multimedia content, or multimedia content accessed via embedded unique URL links. It should be appreciated that the depicted configuration is provided by way of example and may be variously implemented by one of ordinary skill in the art without departing from the inventive teachings herein. Furthermore, the bulleted items listed within a number of the blocks are provided by way of example to clarify the diagram and not by way of limitation.

At the client side 18, a recipient data repository 12 contains information about prospective recipients for the individualized messages which are to be created. By way of example, this recipient information may be accessed via an XML interface 40 which accommodates varying types of client data and database output. The client side 18 is provided access to the multimedia messaging system of the present invention via a client interface 42. Preferably, the client interface 42 allows the client to access the multimedia messaging system over any digital network, intranet or extranet, with the typical example of an extranet being the world wide web, or "internet". The client interface 42 is contained within the content management subsystem 28 of the multimedia messaging system. The content management subsystem 28 provides the tools necessary for creating and administering individualized messaging campaigns. A media content repository 14 contains an assortment of rich media which may include text, graphics, animations, video, audio, music, sound effects, and ecommerce/transaction primitives. Clients from the client side 18 can create messages for a multimedia campaign from rich media elements contained within the media content repository 14. The files from the media content repository 14 are logged 44 after being converted 46, if necessary, from their native format when being accessed by the client. Previous versions of campaign files are retained, including all necessary files and file associations, in an archive 48 which can be accessed directly, or through the use of a search function 50. After the campaign is created, the individualized content may be generated for each recipient based on the recipient information, with an associated series of unique URL links to the individualized content created. It will be appreciated that unique URL links may be created in association with each recipient without generating content at this time, however, content generation errors arising at the time of message delivery would generally not be correctable. The series of links are provided to the client side 18, and the resultant database(s) are then formatted 52 for use by the multimedia engine 30. A collection of emails with individualized message content, or linked thereto, are sent out on the network with an email delivery subsystem 54. Email messages containing multimedia content, such as HTML with embedded multimedia, preferably begin playing the message upon message selection or opening of the message. In email messages that containing a link to the individualized multimedia content, such as by an embedded unique URL link, the embedded link is opened and makes a connection over the network to the delivery subsystem 32. In response, media content is extracted from the content repository 14, by the multimedia engine based on the unique link, and is thereafter converted 46, and logged 44. Media content is preferably converted to a format compatible with the Macromedia Flash™ file format (*.swf), although any of various alternative formats may be utilized. Within the multimedia engine 30 the message is assembled in the context of the design templates 56 and converted for a particular delivery means 58. The individualized message is subsequently delivered by the delivery subsystem 32 in a format to suit the particular recipient. Delivery and interactivity statistics are logged in a reporting subsystem 34 and the results may be made available.

Table 1 provides a matrix of system elements according to the preceding embodiment which exemplifies the association of system elements with preferable input and output mechanisms and embodiments of hardware and/or software that may be needed.

1.1 Solution Matrix

The multimedia message delivery system and method of the present invention provides numerous individualized message deployment solutions. FIG. 5 shows a matrix exemplifying features and characteristics of solutions according to specific embodiments of the invention. It can be seen from the matrix of FIG. 5 that the system may be utilized for providing a number of individualized multimedia solutions for deploying promotional commercials, direct sales campaigns, catalog sales campaigns, and newsletter style advertising. It will be appreciated that the implementation details contained within the solution matrix is provided by way of example and not of limitation. The following hypothetical business cases are provided, by way of example, as in-depth illustrations of how clients may employ the system to provide sales and marketing solutions.

Business Case #1

| | |
|---|---|
| Client: | Upscale Clothing Retailer |
| List Size: | 400,000 names |
| Objective: | Promote fall line, drive online purchases |
| Email Delivery: | Utilizes a third party vendor for list management and delivery |
| Tracking/Reporting: | Online marketing group wants real-time statistics and full statistics at conclusion of campaign to compare with direct sales catalog/promotional campaign |

-continued

| | |
|---|---|
| Solution: | (Flash email embedded). Recipients receive message with individualized audio and specific items being showcased. The items selected for showcase are based on past purchasing habits of the recipients. URLs are passed to a third party vendor based on list of first names and unique identifiers. Client marketing staff are provided access to real time statistics via the online interface accessed through the company site. |

Business Case #2

| | |
|---|---|
| Client: | Major Media/Entertainment Company |
| List Size: | 1,000,000 names (purchased from a 3rd party) |
| Objective: | Promote new daytime talk show, gather list for email newsletter |
| Email Delivery: | Does not use outside vendor |
| Tracking/Reporting: | Interested primarily in number of exposures created and email addresses gathered for newsletter |
| Solution: | Promotional commercial (Flash email embedded) with viral option. Recipients receive message with individualized audio and video image. Parameters comprising recipient first name and state. URLs are passed to a third party vendor based on a list of first name, geography and set of unique identifiers. Playback includes a check box selective to joining the newsletter. The viral option encourages the largest distribution possible and the final report is generated at campaign conclusion. |

Business Case #3

| | |
|---|---|
| Client: | Major Toy Company |
| List Size: | Not applicable |
| Objectives: | Promote new toy line, increase stickiness of site, increase interaction with users, create viral effect among target demographic |
| Email Delivery: | Not applicable |
| Tracking/Reporting: | Product marketing group is interested in measuring on a daily basis: volume of emails generated, average time on site, response rate of emails sent. |
| Solution: | Word-of-Mouth (viral) Flash site resident. Five custom titles are created for the client using content specified by their ad agency. Parameters include first name of sender, first name of recipient, and character names within the toy line. Client product management staff are provided daily access to real-time statistics via online interface accessed through the website for the multimedia messaging system. |

Business Case #4

| | |
|---|---|
| Client: | Online golf products vendor |
| List Size: | 500,000 names |
| Objective: | Drive e-commerce transactions - increase sales |
| Email Delivery: | Utilizes a third party vendor for list management and delivery |
| Tracking/Reporting: | Online marketing group wants real-time statistics and full statistics at conclusion of campaign to compare with direct sales catalog/promotional campaign. |
| Solution: | Direct Sales Commercial (Flash email embedded). Recipients receive message with individualized audio and specific items being showcased and offered for purchase. The message contains actual secure, real time transactional capability, without the need for a browser window being launched. URLs are passed to a third party vendor based on list of first names and unique identifiers. Client marketing staff are provided access to real time statistics via the online interface accessed through the company site. |

Business Case #5

| | |
|---|---|
| Client: | Major Online Ticket Vendor |
| List Size: | Varies - from 500 to 100,000 per campaign |
| Objective: | Promote various sporting and entertainment events |
| Email Delivery: | Handled by system |
| Tracking/Reporting: | Interested primarily in number of click-throughs for each campaign and comparative statistics across lists. |

-continued

| | |
|---|---|
| Solution: | Self service solution - client specific portal is developed which allows clients to select from various message templates, assign creative variables to customer data points, upload and cleanse customer data, and launch email campaigns themselves. Message templates and creative assets for variables are placed into the system and tested prior to being available for client use. Recipients receive message with individualized audio and graphics. Parameters vary based on specific template. Real time tracking measures creative effectiveness and demand for specific events on an ongoing basis. |

1.2 System Use

Individualized message delivery may be provided through numerous networks and devices, as outlined above, to a recipient. For the sake of clarity, the ensuing descriptions will focus on message delivery over an email network. It will be appreciated that the processes and techniques described may be utilized directly, or adapted through obvious adaptations, to provide individualized message delivery through a wide array of network and other interfaces, to a recipient.

Once a multimedia campaign has been developed on the system the emails may be sent out through the email delivery subsystem, or alternatively by a client or third party delivery mechanism, to the recipients. When a recipient opens, or highlights the message in the in-box, the email message sent by the plays. Alternatively, for those recipients whose email service provider does not support HTML, or executables, a unique link is provided in the message that plays the individualized multimedia content through a browser.

1.3 Process Flow

Figure 6:
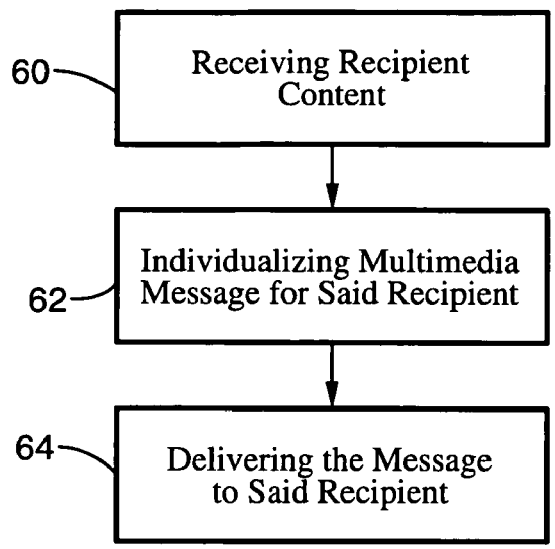
FIG. 6 is a flowchart of the general message individualization method according to the present invention.

FIG. 6 illustrates the creation of an individualized message on the multimedia messaging system. In block 60 content in accord with information about a particular recipient is retrieved. The content may be retrieved in response to a unique URL link, or recipient data. The recipient information is then used to individualize the multimedia message for the particular recipient as shown in block 62. An individualized message is then delivered to the recipient as shown in block 64.

Figure 7:
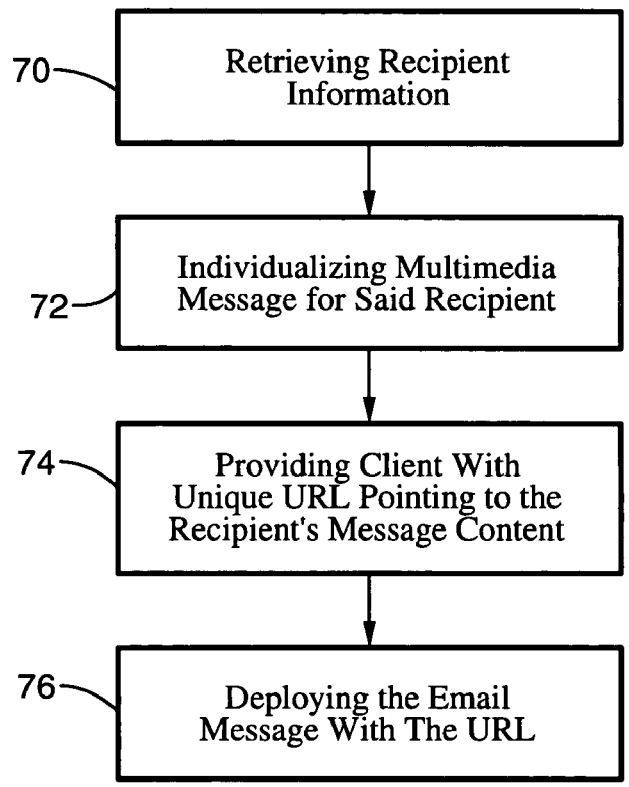
FIG. 7 is a flowchart of email message individualization according to an aspect of the present invention.

FIG. 7 shows a process wherein the client will be sending out the emails, and is provided with a unique URL link to be used for each recipient. In block 70, the recipient information is retrieved, and the message is individualized in block 72. The client is then provided with a unique URL link associated with a particular recipient address, in block 74. The URL uniquely addresses the individualized message intended for this particular recipient. The client then deploys the email containing the linked URL in block 76.

Figure 8:
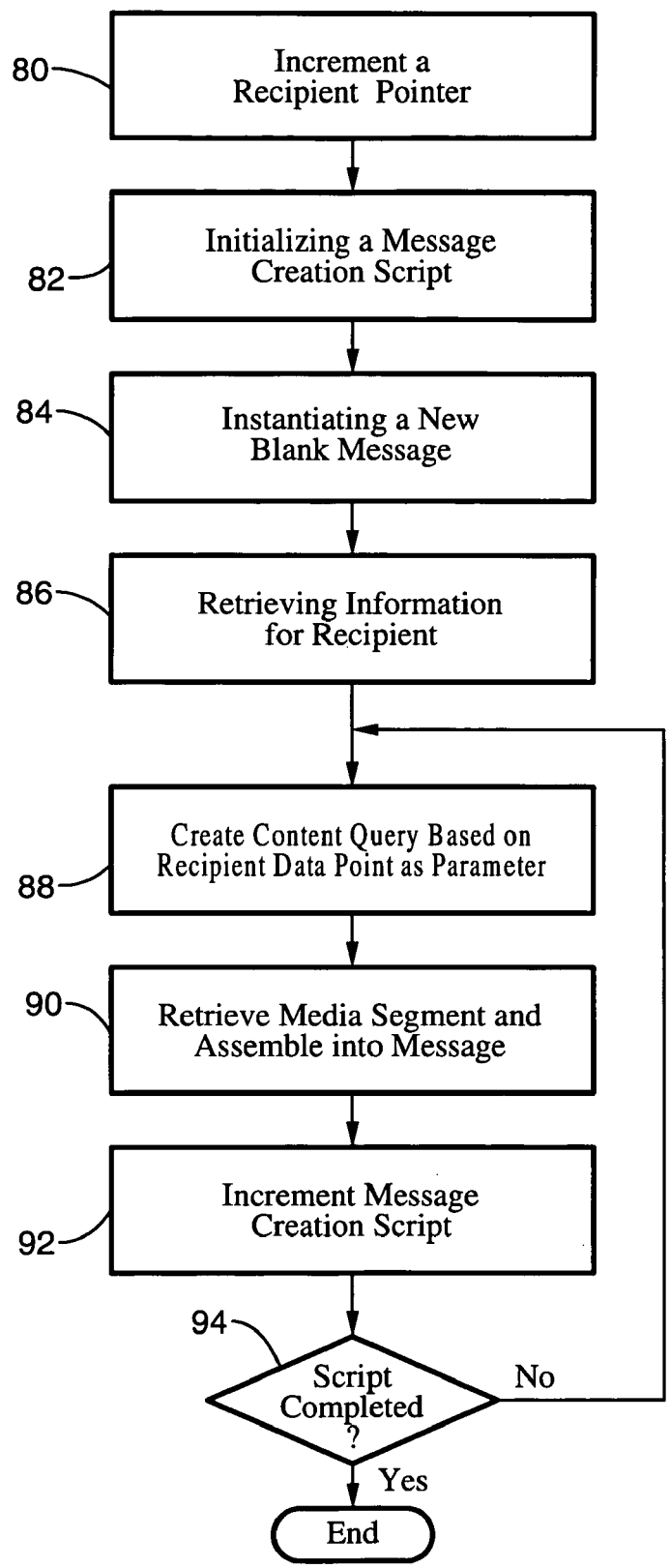
FIG. 8 is a flowchart of high-level program flow for the creation of individualized multimedia content according to an aspect of the present invention which shows individualization of multimedia segments based on recipient data.

FIG. 8 exemplifies a process for individualizing a message containing a number of fields within the content management subsystem. Data for a new recipient is pointed to in block 80, and a message creation script, or loop, is started in block 82 for a new message 84. The recipient information is retrieved in block 86. A query is created, block 88, based on one or more elements of the recipient data. Block 90 shows a query executed to retrieve a media segment which is assembled into the individualized multimedia message, or that is alternately stored separately from the fixed portion of the message to reduce storage size. The message creation script, or loop, is then incremented to the next element, block 92, and unless all individualization has been performed, the process loops back, as shown in block 94 to gather a subsequent individualization element for the message. It will be appreciated that fields of information about the recipient may be used in combination for providing selective multimedia assembly.

As an example of individualized message delivery, consider the following scenario. A first recipient, named "Bob" is a hardworking middle-income family man, he receives an offer in which the voice-over greets him by name: "Bob, how would you like to get away to . . . " It then offers him a vacation package to a place like Florida, which is known to be suitable for children and probably within "Bob's" price range. A second recipient "George" is a high-income individual without children, he is greeted by name and receives the same basic message, however, the destination spot is Paris. The message in this case is not only personalized, but it has been individualized with content specific to the prospective desires of each recipient.

Figure 9:
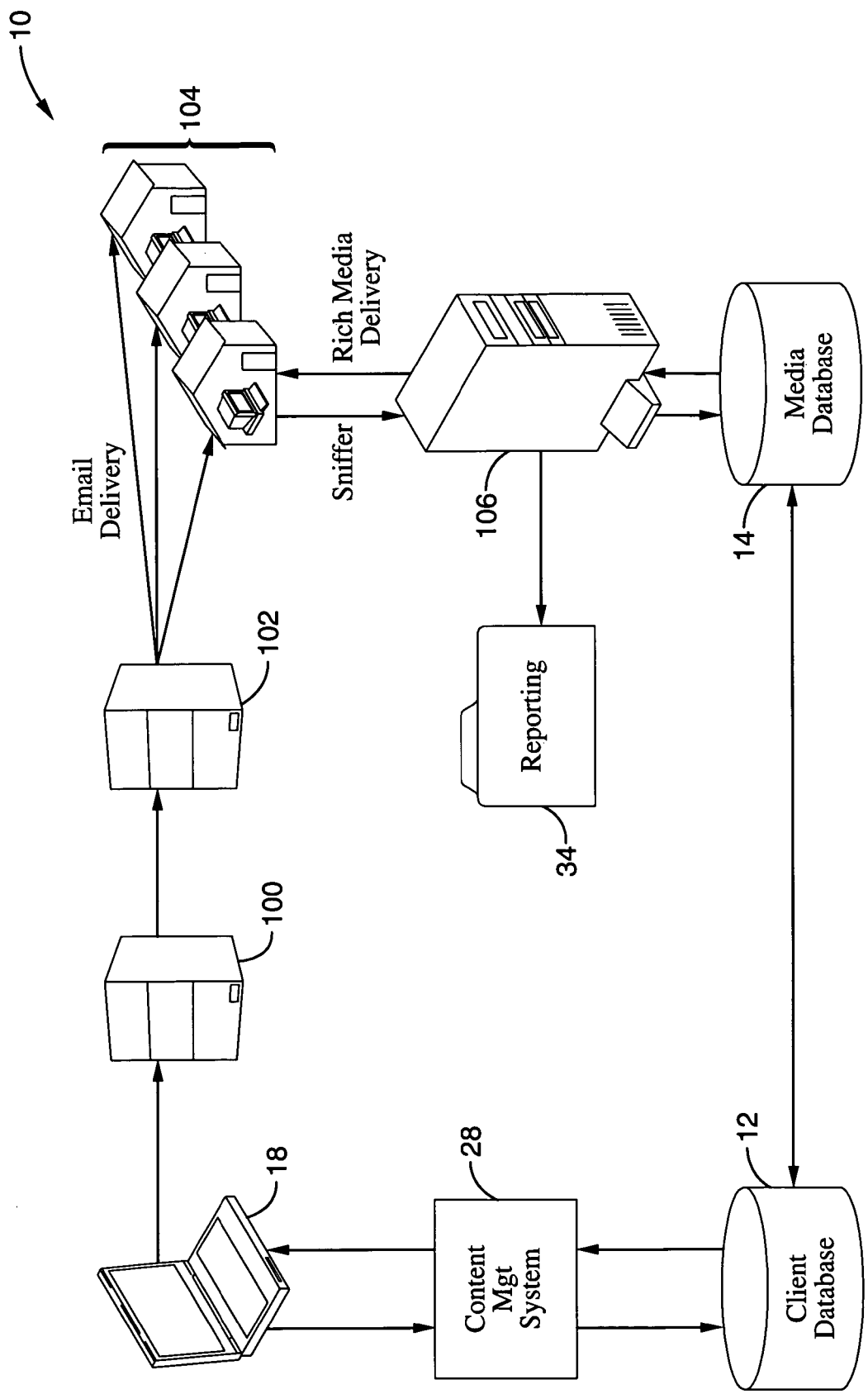
FIG. 9 is a schematic of individualized message development and delivery to recipients according to an embodiment of the present invention.

The basic elements of the email deployment process are depicted in FIG. 9 which shows a client 18 having access to the content management subsystem 28 of the present invention to develop an individualized multimedia campaign including client data 12 and media data 14. Although sending an HTML or similar multimedia capable email is preferred, the figure depicts the more complex process of creating and sending an email having an embedded unique URL. After developing the campaign, the client 18 is provided with the unique URL links associated with the recipient name list. The client then deploys emails to the recipients within a list by interacting via XML processor 100. The email is sent across the internet by an email server 102 and delivered to the recipients 104 for retrieval. Upon access by a recipient, the implicit link within the email opens a session with active server pages on server 106. The active server pages frame the message and determine, by a sniffer, what the multimedia capability of the recipient is. The individualization data accessed by means of the unique URL link is assembled from the media database 14, and played in an individualized multimedia message in a rich media delivery format to the recipient 104. Statistics and information collected when recipients access the link is utilized within the reporting subsystem 34 which provides campaign information for client billing, sponsor analysis, and campaign tracking.

2. Content Management Subsystem

The multimedia messaging system contains a content management subsystem that is responsible for performing the processes relating to access, organizing, and distributing data. Data can be text, audio, graphics, animation or video. The content manager subsystem provides a data interface that is accessible to the client on one side and which fuels the multimedia engine with data on the other. The primary elements of the content management subsystem are a client interface and a set of associated routines for managing the system and the constituent elements of a messaging campaign. In one preferred embodiment of the invention, the client interface is provided by a custom browser application, although numerous alternative implementations are available.

The content management subsystem should preferably accommodate all database formats, including relational databases, ODBC-compliant databases, XML applications, and any database that is capable of exporting in *.txt, *.csv format. An XML transport layer, which is preferably utilized within the system, largely determines the interface between the multimedia messaging system and the client database while allowing the client to access the system as web pages. Use of XML provides for data exchange using standard http protocols, as utilized within World Wide Web HTML pages, over which data can securely pass between the system and the client. In addition, XML permits real-time access to client operational data that is necessary when providing "on-the-fly" campaign customization and individualization an example of which is the individualization of the message according to client input.

The content management subsystem should provide the client with an easy to use, yet powerful, tool that will enable them to upload, search, and manage their rich media content on the file server of the multimedia engine. The content manager also creates the database and directory structures required by the multimedia engine to efficiently retrieve and process the rich media files used in an email campaign. In addition, the content management subsystem provides an ability to archive email campaigns for later retrieval. Archiving a "campaign" requires that all of the files, relationships, and structures utilized within the campaign be saved and that mechanisms be provided to recreate a fully operational campaign instance from the archived data. Furthermore, the content management system preferably provides:

Batch uploading of files
File security and access control
Comprehensive search engine
Version Control system for file check in/out by clients The content being managed may include a variety of data including text, audio, sound effects, graphics, animation, video or ecommerce/transaction. The goal of the content management subsystem is to automate, wherever practical, all content operations. The content management subsystem should at least accommodate ODBC-compliant databases, as well as *.csv, and *.txt exports from databases, as these are perhaps the most common formats currently being used. In addition XML is a relatively new standard that should be preferably provided in any minimum set of interfaces. It will be appreciated that the content management subsystem can be implemented to interface with any current or future database standard.

2.1 Client Side Features

A primary capability of the content management subsystem is that of uploading groups of files using a simple Graphical User Interface (GUI). This feature provides the client with the option of either uploading a single file or a group of files to a specified directory. Once uploaded to the server, the files are categorized in the SQL database and relevant information about the file is logged. This process is preferably implemented as an event driven COM object called when new files are added to the client's directory. The information captured should include: upload date, keywords, original category/directory, and date created. To simplify the development of media assets the GUI interface preferably provides integrated viewing and playback functions, as either text titles or thumbnail views, for the media elements, so that the developer may concentrate on the message being developed.

Figure 12:
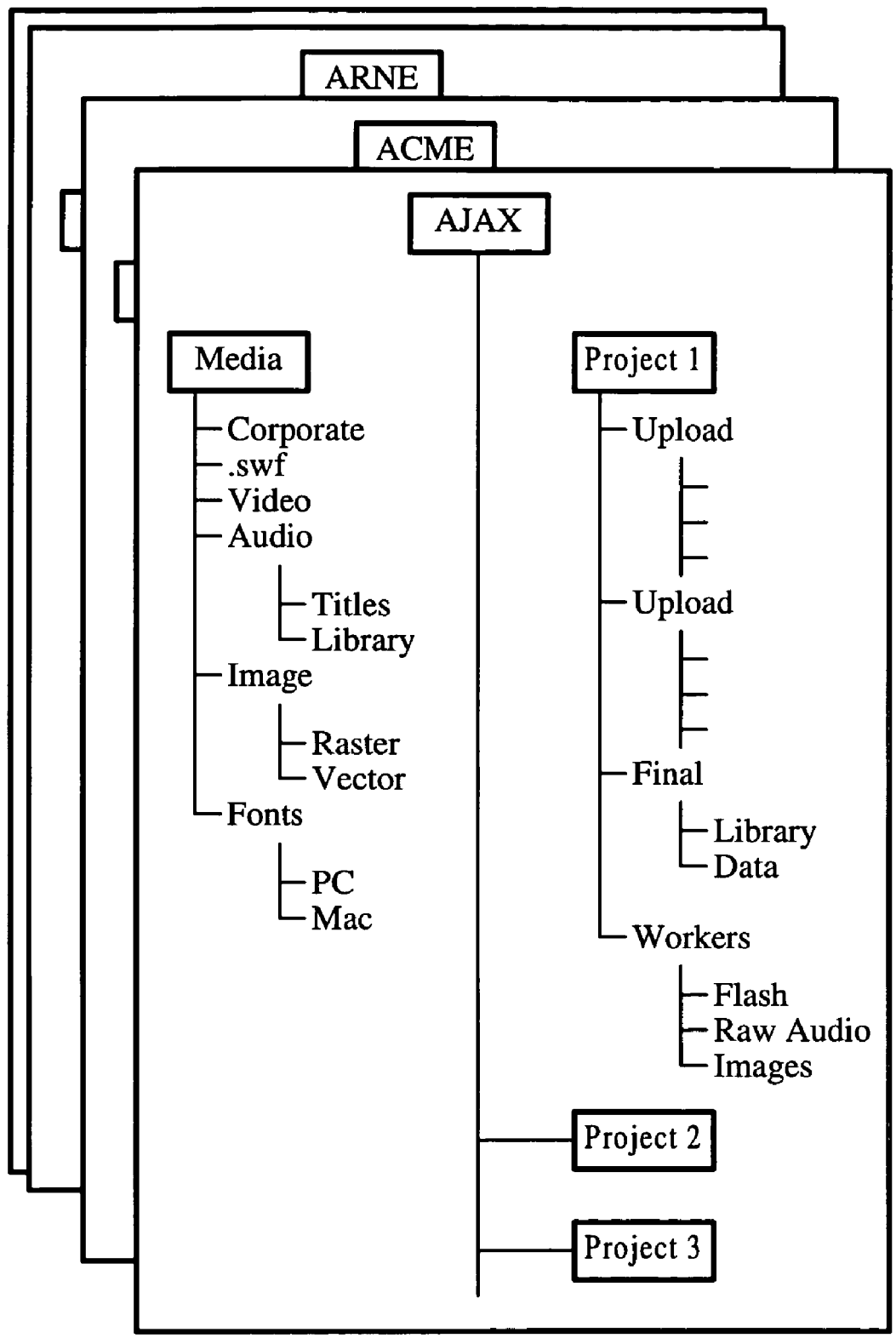
FIG. 12 is a diagram exemplifying campaign file structures within the system according to an aspect of the present invention.

Referring now to FIG. 12 is an upload screen, shown by way of example, that may be utilized within an embodiment of the multimedia messaging system. After gaining system access privileges, a client-user may access an upload screen, such as that of FIG. 10 to upload data or media files from the client database to the system for use in developing their campaign. If known, the user may enter specific file names 110 to be uploaded. If specific filenames are not known, or readily available, metadata (information) about the file may be entered; an example of which is the keyword field 112.

Figure 10:
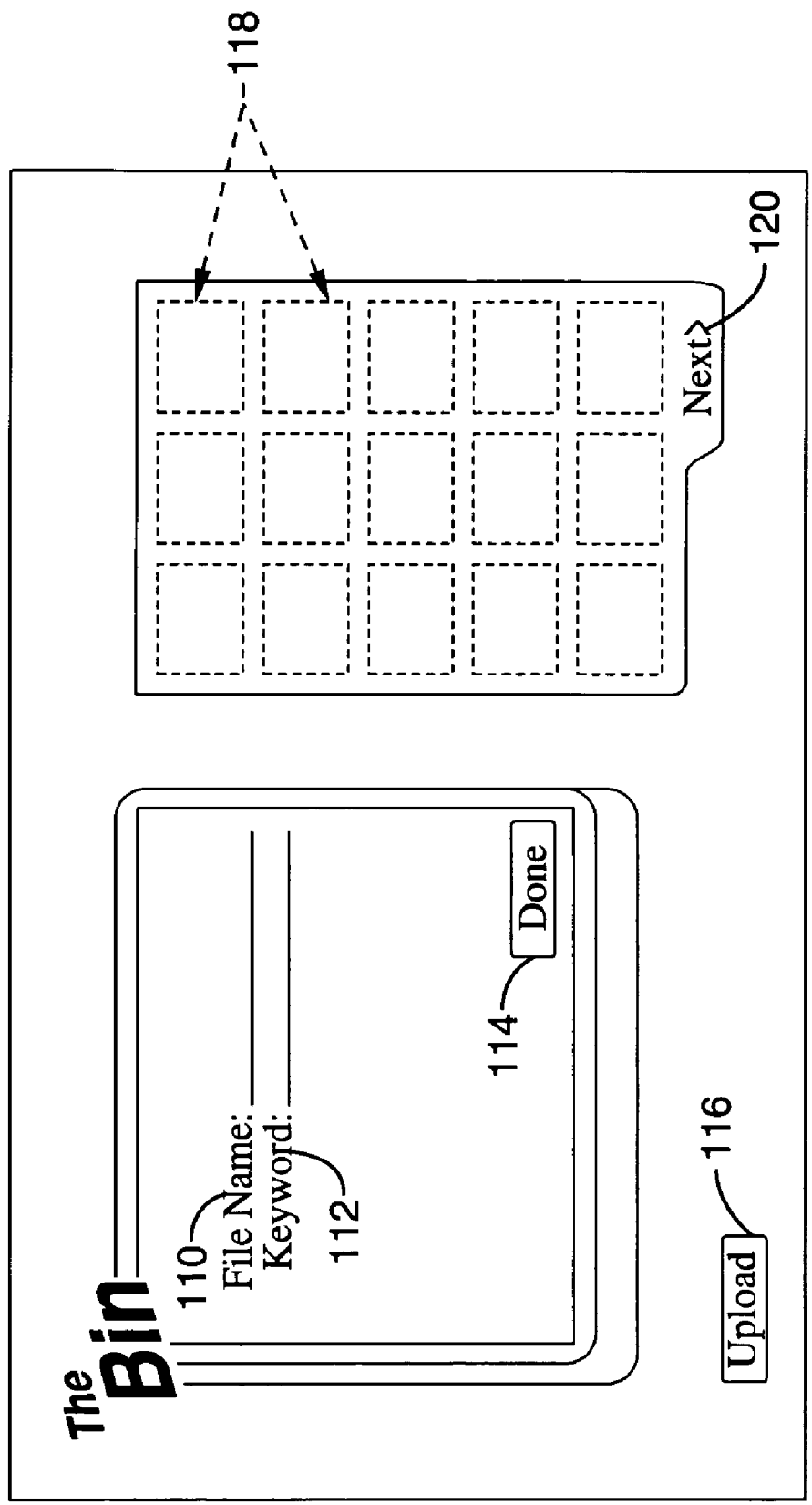
FIG. 10 is a representative screen for providing client control of media uploading according to an aspect of the present invention.

After entering the specific file name or metadata, the Done button 114 is clicked to initiate either a file upload (or alternatively a download), or a search. The user is presented with the specific file(s) requested or a list of files based on the keyword search 112, the files or list appearing in the file cue 118. Files appearing in the file cue 118 can either be accepted for uploading by clicking Upload 116, or deleted. Files may be uploaded into multiple file cues, and accessed by using the Next button 120 to move from one file cue to another. The screen of FIG. 10 is provided as a single example of a screen which supports the upload functionality, however, it will be appreciated that any form of interface may be utilized within the invention for supporting upload capability.

Figure 11:
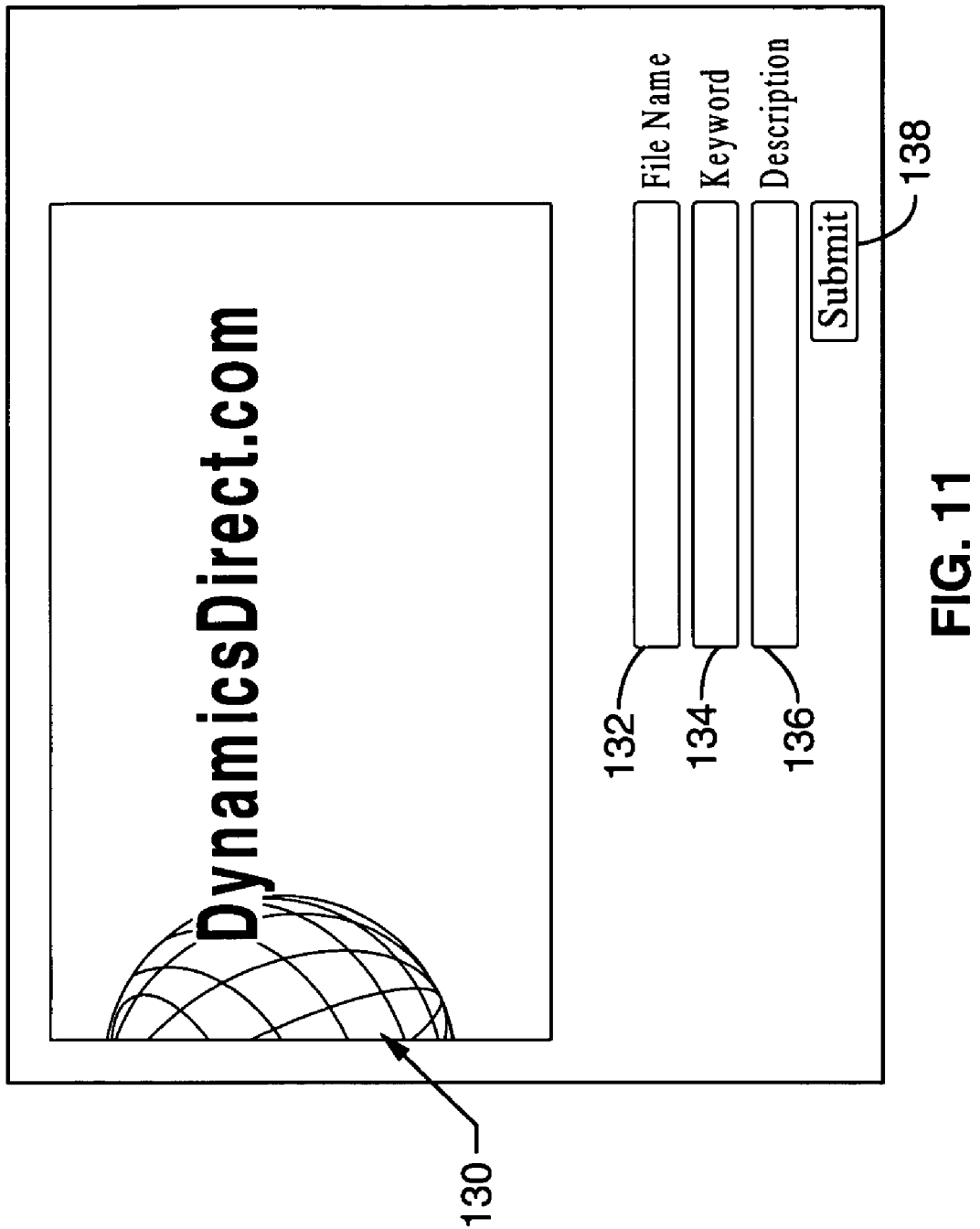
FIG. 11 is a representative screen for displaying and labeling of a specific media element for use within the system according to an aspect of the present invention.

An additional upload screen is depicted in FIG. 11 which provides a similar upload functionality for use with a single file. This upload screen immediately views/plays the selected file within screen area 130, but the screen shown does not support a search function. The benefit of single file functionality is that the file, should it be a media file, is thereby immediately viewable. The user simply types in a file name 132 and presses the "Enter key" on the keyboard (not shown) to display the file within the screen area 130. Information about the file is preferably displayed, such as the keyword field 134 and description field 136. Furthermore, the system allows the user to enter or modify the file information to facilitate managing the campaign. If the correct file for uploading has been located, then the Submit button 138 is pressed, otherwise the process of file selection may continue. Implicit within the workings of the Content Management System is a file storage and access structure automatically created for each new client/campaign. This structure linked to the Content Management automatically directs uploaded files to the appropriate subdirectories for access by the campaign.

The file interface provides for manipulation of files by name, or by their representative thumbnails. The files may be organized into various client accessible directories which preferably are organized to keep work directories separated from the finalized campaign files. It will be appreciated that since active campaigns may be altered "on-the-fly" according to the campaign, it may be a dangerous practice to develop new campaigns alongside of an active campaign, since any inadvertant file changes to files used by the active campaign would be reflected immediately within the active campaign. The interface provides a convenient mechanism for manipulating the files and the drag and drop file handling method is a user-friendly method of transferring files between sections of the directory. To speed access to the correct media assets during development, each of the media assets may be viewed/played by the developer. Furthermore, each asset may be described and associated with a set of keywords which facilitate searching for, or the collecting of, assets at a later time. FIG. 11 shows a screen which provides a full view 130 of graphical assets by filename 132 which the client may "label" through the description field 134 and keyword field 136. Once the asset is labeled, the "Submit" button 138 is pressed to finish the update.

2.2 Client Interface Options

A wide choice of mechanisms exist for supporting the client interface for any particular model of system deployment. For example, with a client access deployment for large ad campaigns, the preferred interface is a custom browser that provides access to, and data transfers with the multimedia messaging system. The custom browser may be developed and configured to provide the functions and integration features desired by an organization deploying the messaging system. Data security is a major concern for large corporations as client lists are often critical corporate assets which are capable of sustaining a competitive advantage. All activities within the system are password protected. In addition a custom browser should provide a "Version 1" secure environment for corporate clients accessing their data on the system. The custom browser can additionally provide a significant speed advantage over standard browsers while streamlining the use of application specific functionality. It will be appreciated that a standard browser may be utilized for low security tasks, such as certain reports, even for a large corporate client. For systems deployed within a client deployed model, a custom or standard browser may be used on the corporate intranet, or a custom interface application may be utilized. The use of a standard browser is preferred when deploying the system for demonstration purposes, or small, security insensitive deployments of individualized multimedia messages. In any case, password protection, and the employment of standard firewalls provides sufficient security protection.

2.2.1 Custom Browser Functionality

The custom browser utilized as a client interface preferably provides the following system functions, which are provided by way of example and not of limitation.

Registration and security: Access to the custom Browser should be limited to clients have pre-existing accounts on the system. Clients should be assigned a unique user name and password. During the installation, a registry entry is created on the system and the security information along with machine ID is logged into the system database. The logging of the machine ID allows tracking of the particular machines upon which the custom Browser has been installed, wherein installation can be limited to one installation per unique ID.

Browser core: Preferably a branded Internet Explorer™ (IE) Browser is adapted with a subset of the IE functionality as the custom browser. Clients, using the custom browser, may upload and download both data and other digital asset files; preview, view, or play media files; manage content, and be provided with a portal to the multimedia messaging system interface.

Interface to multimedia messaging services: The custom browser can provide the client portal to the client center of the multimedia messaging system. Using the custom browser as the portal assures added control over the parties and locations from which client center access my occur. The custom browser preferably limits client access to the client center of the multimedia messaging system and does not provide clients the ability to "surf the net".

Secure data transfer (single file and batch): The custom browser preferably utilizes an SSH protocol (Secure SHell) to insure the security of database transfers in both single and batch upload modes.

Digital asset upload (single file and batch): The custom browser also preferably utilizes the SSH protocol to insure secure asset uploads and downloads in both single and batch modes.

Digital asset management: The custom browser should allow clients to upload, download, and manage all campaign related digital assets.

Asset preview, play, or view: The custom browser preferably allows clients to preview, view, or play assets that exist or are to be uploaded into the content management subsystem.

User tracking and activity reporting (log files): All activities that occur during a user session are logged to an activity file. The activities being logged include, but are not limited to, uploading, downloading, moving, and deleting of asset and data files; logging in and out of the system; searches; and previewing, viewing, or playing asset files. Upon session termination, the log file is preferably parsed into an SQL database and made available to the system administrator and respective clients in the form of tracking reports.

"Blind" file and directory backup and retrieval: Regular tape backups of the content management subsystem directories allow clients to request full directory or file backups for any specified date. If a client uploads a file to the content management system that already exists, the system first moves and renames the original file before uploading the new file; therefore, none of the files are overwritten. The file moving and renaming activity is captured in the log file to simplify retrieval of the original file.

File overwrite prompt: The system prompts the client prior to the replacement of an existing file, even though the original file is not overwritten.

Search engine using the Thesaurus application: The Thesaurus application is third party software that provides two unique search capabilities to the content management subsystem. During file uploads, the client can associate key words with the file being uploaded. The Thesaurus application utilizes those key words for searching and is preferably capable of expanding the key word list. The client may enter a search word to the Thesaurus application which returns a list of key words entered by the client. The key words may then be used for searching the database to return all assets relating to the entered key words.

Integration to backend databases and applications: The database model for the content management subsystem must be integrated into the data model of the multimedia messaging system so that the custom browser will integrate seamlessly.

Auto update of custom browser: Upon logging into the client center, the custom browser preferably performs an automatic check of the browser version. The system is capable of automatically updating older versions of the custom browser to the latest version.

Smart install: The custom browser application can be distributed on business card CD-ROMs that provide browser installation and initialization followed by internet access to complete the installation process.

Version control: Standard software application version control is preferably provided to support the automatic updating of the custom browser, and the smart installation mechanisms.

2.3 File Organization

The content management subsystem provides clients with the ability to organize their content after it has been uploaded to the server. The directory may be populated either manually or automatically, and the resultant file structure and directory locations are reported to the client. A hierarchical file structure is preferred which provides unique campaign/client specific subdirectories that are password protected. Upon logging onto the system, the client will be routed to their project folders. An interface is provided which allows the client to name and upload a set of assets to initiate data integration and updates. A standardized directory structure is automatically created at the inception of a new campaign project for that particular client. The content management subsystem provides client access to the project files which allows clients to upload, combine, or integrate the files and separate the lists contained therein. The client uploads files to the upload directories with the most recent uploads being associated with the active campaign project. In the default setting for the system, new files do not overwrite previous versions. This precaution allows the tracking of updates while it maintains the availability of old file versions.

An example of the file structure for one hypothetical client, AJAX, is shown in FIG. 12. The file structure used for this embodiment is shown as having files organized by project and media. The project files allow for uploading of content, work areas, and directories for storing final campaigns. It will be appreciated from FIG. 12 that the system can support an arbitrarily large group of clients which each may be developing multiple projects. After a campaign has been completed, all the files associated with the campaign are archived.

The client may create categories for their content and organize the uploaded files into these categories. Each category can be as detailed or as general as the client desires. Clients preferably have full control of the categories, which includes the ability to upload files into, delete files from, and move files between the different categories. For simplicity, the categories are preferably directly associated with the directory structure as follows:

Create New Folder=Create New Category
Create New Sub Folder=Create New Sub Category
Delete Folder=Delete Category
Delete Sub Folder=Delete Sub Category Although clients may manage their own content, they are restricted from accessing files associated with the content of other clients, and preferably are not allowed to gather information on other clients, or associated campaigns, which are being supported on the server.

2.4 Searching for Content

The content management subsystem preferably contains a content search engine to speed the development of client campaigns. The development of an individualized multimedia campaign requires that numerous content files be referenced by the developer. Although the client could find files by doing a linear search through each file, this would be extremely time consuming. Therefore, the system preferably supports content searching, wherein the content may be searched according to parameters, such as description, or keywords, which are stored for the element of content, or by parameters associated with the element of content, such as file type, size, and duration. To further simplify the content searches, a Thesaurus engine is preferably provided. The Thesaurus engine may be utilized when files are first uploaded, and when clients search the database from the content management subsystem. Upon unloading a file, the Thesaurus engine is sent the name of the file and returns all "keywords" that correspond to the file name. These "keywords" will be written to the database as will make up the keyword information of the file. These keywords may be edited by the client at any time. When the client searches the content management subsystem for content, the Thesaurus will once again be called, only this time it will create a list of "keywords" that will be used to search the database for content, looking in the "keyword" field of the content table to make a match. Once the search is complete, all related files would be listed in the main window.

2.5 Server Side Features

The core of the email campaigns and the content management subsystem are the databases. The preferred database access method is structured query language (SQL), although it will be appreciated that alternative database access methods may be used. As clients organize their rich media with the content management subsystem, the SQL database is automatically updated. The multimedia engine can employ this database to create individualized messages in real-time as they are accessed. The database additionally allows the clients to alter their email campaigns. For example, they may elect to select a different image for use in the email, and would use the content management subsystem to replace the old image with a new one. These changes may be performed "on-the-fly" while a campaign is active.

Figure 13:
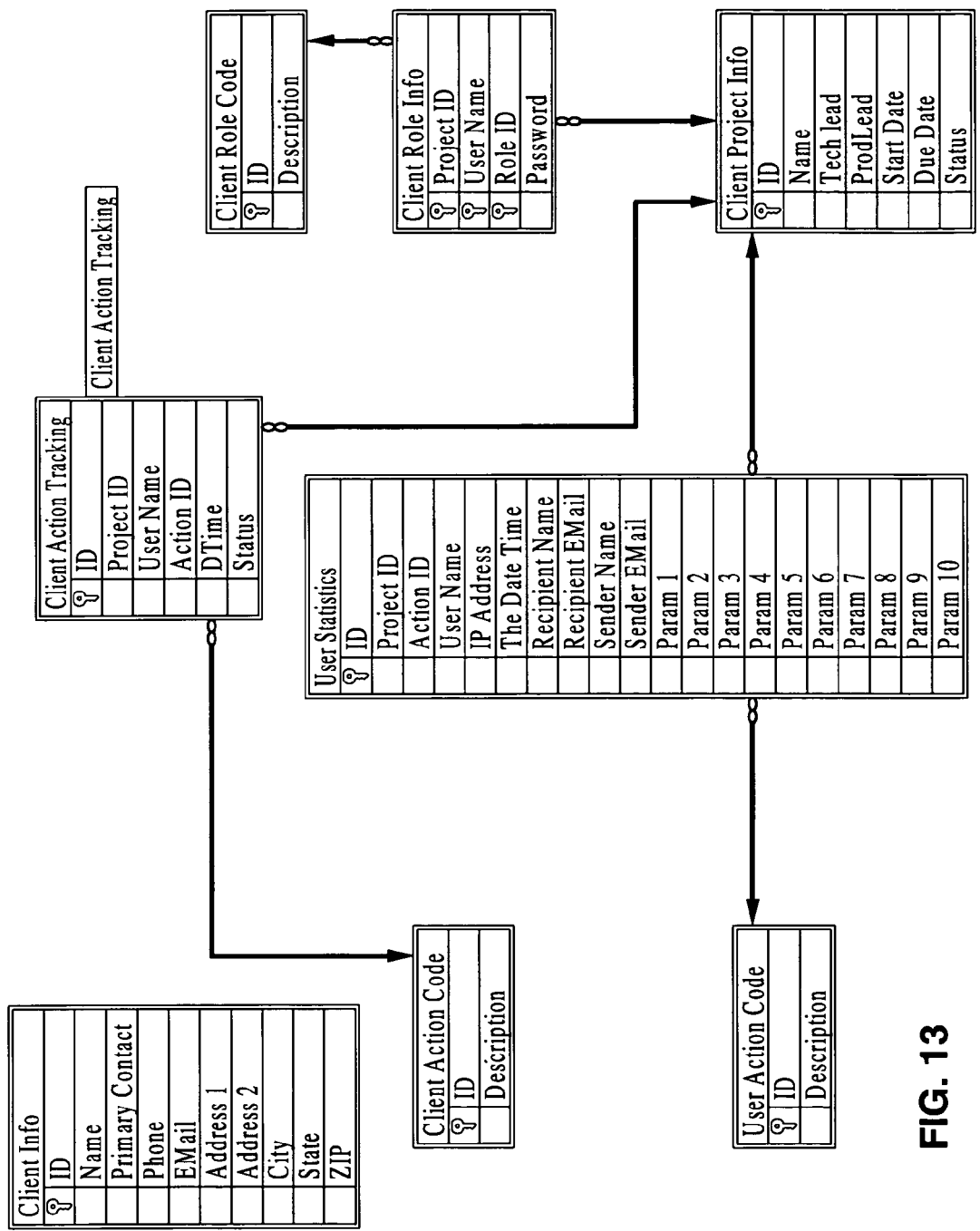
FIG. 13 is a database schema for the content management subsystem according to an aspect of the present invention which exemplifies relationships between client and project data entries.

A database schema of the client/project database according to this embodiment of the present invention is shown in FIG. 13. This database contains information necessary for administering client access and system utilization consistent with active server pages and is required to securely support multiple clients, multiple projects, and multiple users per client.

2.6 Client Database Integration

The multimedia messaging system utilizes information obtained from the client for constructing and executing a campaign. Preferably, the system directly integrates with the client database so that the necessary assets may be transferred. However, situations can arise in which the client database and the multimedia messaging system are incompatible and not capable of being directly interfaced with one another. In these situations a custom application may be utilized as an intermediary to perform the data handoff required by the client. The implementation of the intermediary application is expected to be unique for each client. The intermediary provides an interface which includes provisions for planned data integration, on-the-fly data capture, along with access and disposition.

2.7 Dynamic Message Capability

The multimedia system preferably provides dynamic message capability wherein an advertiser can change the message to recipients which have not yet opened the unique URL to the individualized message. In executing a typical email campaign, the emails are sent out containing a specific message, that once sent, may not be altered as the email itself is resident on the ISP of the recipient. However, within this embodiment of the invention, an email is provided with a unique URL that is directed to an application service provider from which the actual individualized message is generated. Therefore, the advertiser may change the content of the message after sending out the emails having the embedded links for providing individualization. The dynamic capability allows advertisers to change a campaign which has already been sent out, based on the response from recipients who have already picked up their email. Consider a hypothetical example campaign wherein individualized emails are sent out for a "Brand X" MP3 player offered for sale at $49.95 to a list of recipients. After 25% of the emails have been opened, with the individualized message played, the 50,000 MP3 players in stock have been sold out. The advertiser may switch the campaign information on the fly, such as new graphics, text, audio, and message so that subsequent emails are opened with an alternative offer of a "Brand Y" MP3 player including a free download for $59.95. This capability eliminates wasted advertising, since the recipient receives an advertisement for a product that is in stock. The advertiser can also change the pricing on an item in accord with demand, such that if the item begins selling too fast, the price can be increased and if too slow, the price can be reduced. This form of dynamic campaign adjustment provides a means of implementing true market-based pricing. Furthermore, items showing a low click-through can be replaced with alternative offers. Preferably, the campaign is organized with preset alternatives, so that dynamic content changes take place automatically in response to predetermined limits set on various metrics of the campaign.

2.8 Interactive Message Capability

Another form of message customization that is preferably provided is an interactive message capability wherein the message can be changed on-the-fly in accord with user interaction. The user message incorporates the acquisition of interactive responses from the recipient and utilizes the responses to generate appropriate messages. Interactivity creates what is often referred to in the advertising field as "stickiness", which is measured by the time spent viewing or interacting with the associated page, pages, or site. Consider a hypothetical example of a new on-line sporting goods retailer that sends an individualized grand opening message to a list of recipients. Once opened, the message can play an audio, graphic, animation, or video that contains the name of the recipient and then prompts the recipient to select their sport of interest. If the recipient, for example, selects tennis, then a customized message is played which advertises a line of racquets and stringing services. Interactive message capability can improve ad campaign response rates and resultant order rates. Sponsors are also provided with the ability to collect survey and/or other types of information from recipients in real-time. Recipients can lead themselves through a message that is organized as a "storytelling" session wherein client choices determine the direction of the continued story. Furthermore, the use of interactive message capability provides an improved mechanism for collecting data about the recipient which is returned to the recipient database of the sponsor. The data from the interactive session can be passed back to the client database via an XML interface.

3. Multimedia Engine

The multimedia engine is a collection of processes, applications and rules which, operating collectively, create the individualized messages. The multimedia engine, using an existing code library is capable of combining the email recipient information, as provided by a client, with existing email message templates. The message templates accommodate the various rich media capabilities across all email service providers, including those email service providers that do not support HTML, or embedded executables, and where necessary the multimedia engine assembles a unique URL link to provide for click-back. The multimedia engine includes the ability to detect, by various means both traditional and non-traditional, multimedia capability (e.g. the type and status of resident plug-ins) of the recipient. Also contained within the functionality of the multimedia engine are a set or rules which guide interactivity, should the particular campaign solicit dynamic responses from the message recipient.

The data to be accessed by the multimedia engine has preferably been organized by the content management subsystem within a hierarchical file system to expedite retrieval of the database content by the multimedia engine when assembling an individual message for a recipient. The multimedia engine was developed to provide maximum coverage and functionality for all popular plug-ins.

3.1 Preferred Configuration of Multimedia Engine

The preferred configuration of the multimedia engine utilizes the Macromedia Flash file formats running on NT servers. It will be appreciated, however, that the system may be implemented for operation over Linux, or OS10, and may utilize Java, along with various video options.

3.2 Cases of Client Interaction with the Multimedia Engine

The following cases are provided by way of example and not of limitation of three preferable ways in which the client-multimedia engine interaction can proceed:

Case 1—Client provides access to relevant portions of their entire database. The multimedia engine accesses the requisite data, imports it into a pre-designed template and emails the message. The recipient then accesses the media file, such as an SWF file (in Macromedia's Flash file format (*.swf)) which is an open standard for multimedia content. Alternative forms of media formats may be utilized with the addition of the corresponding drivers.

Case 2—Client does not provide access to data, but provides http transfer of XML. The client accesses the requisite data and using a multimedia engine provided protocol, inserts the data into the required template which is then transferred to multimedia engine for emailing. The recipient then accesses the SWF multimedia engine server for playback.

Case 3—Client does not provide data access, choosing to deploy the emails themselves. The client is provided with the ability to create the unique URL links associated with recipient. In this instance, the client would typically either pay a use fee, or purchase outright the necessary multimedia messaging applications to implement the desired rich media campaigns.

The multimedia messaging system of the present invention includes support for the preceding three categories of use along with similar use scenarios.

4. Digital Delivery

The preferred display mechanism of the multimedia messaging system is Flash, which allows for dynamic display of graphics, text and other media. This dynamic capability is available by using Macromedia's Flash file format (.swf) because it accepts data queries. Parameters are sent through an active server page, or pages, which process a request and return data in Macromedia's Flash file format for display. The Flash file format is preferably utilized for both media display and client reports. The system may in addition utilize any of the numerous alternative formats available now or in the future. By way of example and not of limitation, these alternative formats include: QuickTime™ from Apple Computers (*.mov files), Windows Media Player from Microsoft™ (*.wav files), and Real-Audio™ from Real Networks.

In the present embodiment Macromedia's Flash™ integrated scripting environment, is used in conjunction with active server pages and XML applications to interpret variables and to both retrieve and modify dynamic content. This integration of content is performed at run-time in real-time. Typically, the system would be implemented to interface with databases supporting SQL, although other query language standards can be easily supported. The active server pages determine the selection of information to be returned and the method of display within Flash.

4.1. Delivery Process

The multimedia messaging system of the present invention is capable of delivering individualized multimedia message content through a variety of delivery mechanisms, such as by email, networks, downloads, and printers. The preferred delivery method is that of delivering email messages which play automatically.

Individualized multimedia messages which play automatically are created using HTML templates to deliver content to an end user, such as to an email account. These templates contain tags for embedding multimedia content within the message. Each individual user receives a unique set of "embed" commands which upon activation extract content from the server. The multimedia content is assembled dynamically within the HTML template in a unique fashion for each unique recipient. If the recipient has the capability to receive HTML email, or rich media content, the multimedia within the message will play automatically without the need of user intervention.

Although not as user friendly, alternate templates may be used for linking multimedia content for clients whose email system does not support embedding of multimedia content. In these cases, a link to a unique URL is embedded in the template so that the multimedia content may be viewed/played through a web browser. Preferably the URL is made unique by the inclusion of a unique user ID. Upon accessing the unique URL the user is taken to a web page that assesses the multimedia capability within the specific web browser. This assessment could be in the form of JavaScript "sniffing", but is preferably performed by a combination of HTML and the multimedia content itself. For example, a small multimedia file can attempt to redirect the web browser to a page where the main multimedia content would be displayed, however, if this redirection fails, presumably because of the inability of the browser to accommodate the multimedia content, then the HTML takes over and redirects the browser to alternate content.

Typically, alternate content would comprise a message with more limited multimedia, and thus a downgraded multimedia experience. For example, the alternate content could comprise a static graphic or text experience, and/or messages which direct the user to perform actions which would allow them to view the multimedia content. If the browser of the user is determined to have the proper capabilities, then the unique ID within the URL is processed as part of a database query to fetch the relevant content for the message which is then assembled and displayed dynamically.

Figure 14:
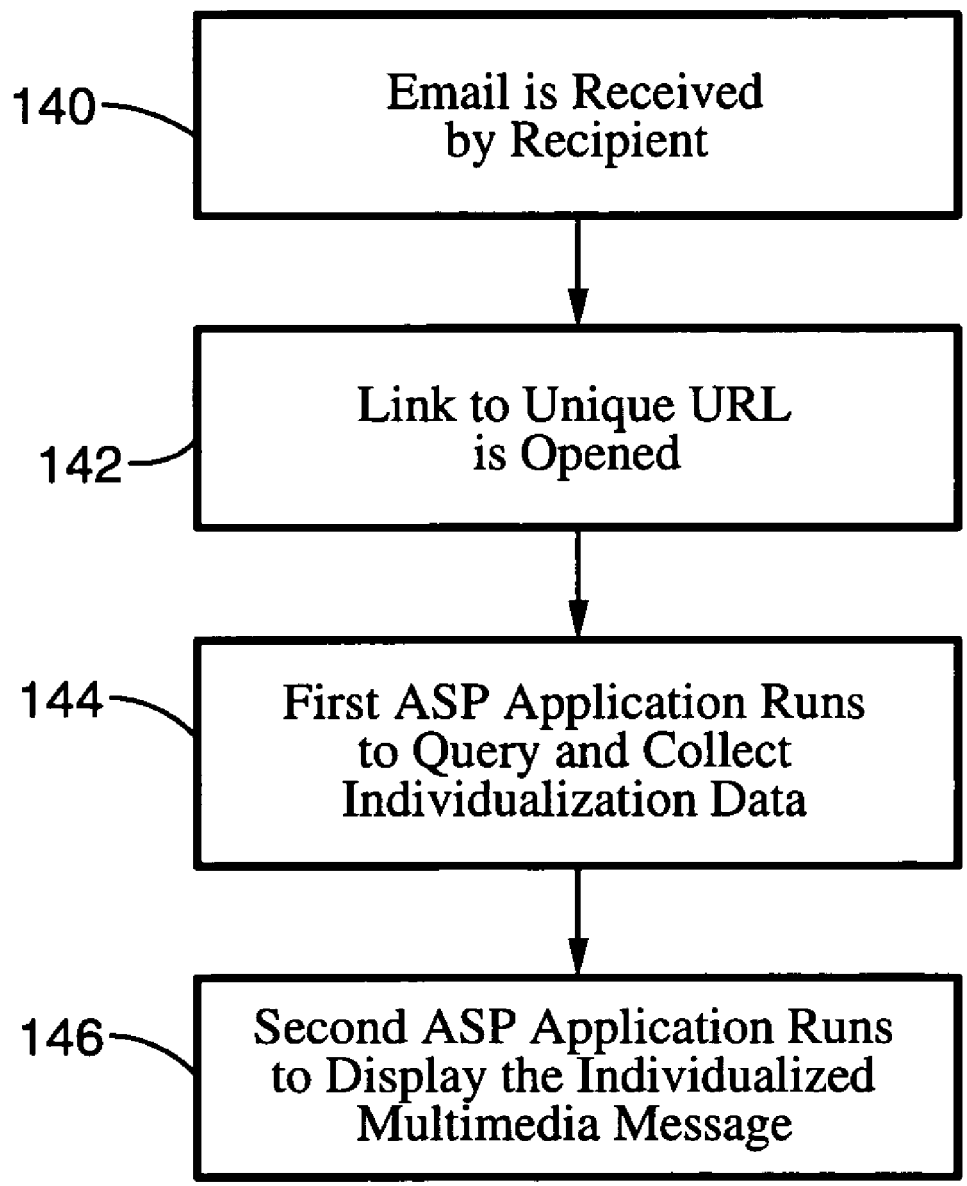
FIG. 14 is a flowchart of the individualized message delivery process utilized according to an aspect of the present invention.

FIG. 14 provides an example of the individualized multimedia message delivery process which utilizes the unique URL links. It will be appreciated that the preferred delivery of the individualized multimedia content is within the message itself, wherein the message begins playing immediately upon the user highlighting, or opening, the email message within the email in-box. Users having an application service provider that does not support, or is not configured to allow, HTML or rich media play within an email are provided with a clickable link, which may be embedded within a graphic. Activating the link triggers playing of the individualized multimedia content through a browser, the process being described starting at block 140 wherein the user receives an email. The link is opened in block 142, preferably by having the user click on the link. As the link opens, a first active server page(s) (ASP) application is called by "<strselect>link.asp", which is executed as block 144. The first active server page is exemplified by a routine "link.asp", which uses the message identification field as the search criterion to query the content database through the active server pages for the content necessary for individualizing the message for this recipient. The routine link.asp retrieves all variables associated with an individual recipient, as identified by a unique message ID (msgid), and passes them to alt.swf, which is embedded in link.asp and used for redirecting Flash content. The minimum required Flash player for the exemplified embodiment of alt.swf is version 3.0, this allows the main Flash content to display a message regarding the need to download the latest Flash player Although not visible to the recipient, the exemplified link.asp routine outputs to the screen an HTML page that embeds an invisible Macromedia Flash™ movie, that may be referred to as "<strselect>alt.swf". The Macromedia Flash™ movie receives all the data for individualizing the message. The HTML page optionally may include an image, such as "Fallthrough.gif" that appears to recipients that do not have a plug-in capable of playing the file. The image contains a link to allow recipients to download a player capable of playing a file in the Macromedia Flash (SWF) format. This image and link is an animated GIF that fades in about three to five seconds after informing a recipient without a proper plug-in that they must download a Flash plug-in. The graphic contains information about downloading the Flash player, as well as a link to the Macromedia Flash™ download page. To ascertain if the user has the proper plug-in, an automatic delivery configuration routine, or sniffer routine, is used which "sniffs" for the Flash plug-in (automatic delivery configuration is described subsequently). If the player has the plug-in, or has just downloaded one, then a second active server page(s), "alt2.asp", is accessed as shown in block 146. The second routine of block 146, is called by "<strselect>alt2.asp" and it receives the data for individualization of the message and displays an HTML page within which is embedded the final Macromedia Flash file movie that has been created for the specific recipient. It will be appreciated that the above describes the use of the Macromedia Flash™ file format for displaying a movie, however, other forms of multimedia may be played using a variety of display programs and associated file formats.

The routine alt.asp is a container for final.swf when viewed within a recipient browser. The file final.swf requires modifications for a specific project as follows: (1) final.swf should reflect the actual flash file for the project; (2) at the discretion of the developer, the file uses the variables n1,n2,pn1,pn2, pn3,e1,e2,p1,p2,p3, and msgid and can be modified to use only those variables required by the design; (3) the size and background parameters for the object and embedded tags should reflect the requirements of the project; (4) alt.swf determines Flash redirection and the file is preferably configured as 18×18 pixels in size, and it should be modified to have the same background color as link.asp. (5) alt.swf is contained near the top of link.asp to redirect the user if they have either Flash3 or Flash4.

The structure of alt.swf preferably provides a Macromedia Flash 4™ file having four frames. The first frame contains a "Get URL" statement constructed as an expression which redirects execution to a file called alt.asp.

4.2 Automatic Delivery Configuration

Automatic delivery configuration detects the vital aspects of the recipients viewing/playback device (i.e. PC, PDA, cellular phone, interactive television) and configures the message to provide optimal representation on the given stream and device. Automatic delivery configuration also provides for synchronization of multimedia elements, such as synchronization of audio with video.

The configuration should take numerous factors into account, including connection speed, multimedia capability, and the email service being utilized for delivery. The amount of material sent can be tailored to the bandwidth of the stream, so that recipients are not unduly delayed in viewing/playing multimedia content. In addition, the level of multimedia capability available for the recipient to view/play the message on a specific device can be determined, so as to maximize the multimedia experience. Although about ninety percent of PC have some sort of Flash plug-in, these plug-ins are of various revision levels If the only Flash plug-in available is an older incompatible Flash revision, or a problem exists with the Flash plug-in, the system can install a new Flash plug-in for the recipient.

Generally, three standard mechanisms exist by which an individualized message may be dispatched by email delivery. The first method is delivery via a standard template that contains the rich media message and unique Macromedia flash file created for the specific recipient. The multimedia message begins streaming and playing automatically as the message is highlighted in the email inbox of the recipient. A second mechanism is utilized for email service providers which do not currently support HTML or executables within the inbound email. Alternate content is provided over these email providers, such as AOL™ and CompuServe™ that do not permit executing Flash files from within an email message, by including text in combination with a clickable link. Clicking on the link opens a browser connection to a site whereupon the unique URL is accessed through the browser to deliver the unique rich media message to the specific recipient. A third mechanism is provided over email service providers, such as Hotmail, Yahoo, Excite, Snap, Altavista, and Lycos, that allow images to be embedded within the email, but do not directly support viewing/playing of rich media files. The email message, in this third case, preferably includes a static image (such as a *.gif graphic file) and a clickable link, either embedded in the graphic or as a separate text link. Upon clicking the link a browser opens to deliver the rich media message.

4.3 Delivery Limitations

The multimedia system of the present invention provides a deployment mechanism which is expected to be compatible with the majority of current and future digital delivery systems. However, situations can exist wherein the individualized message delivery is prevented or limited. For example, corporate firewalls can be configured to block or limit the receipt of HTML email, Flash files, and additional file formats as a security measure against viruses. In addition, a small percentage of systems exist that contain older email programs, such as CCMail™ from Lotus and others which may not support, or which otherwise filter out the multimedia content. Furthermore, various mail systems provide forwarding mechanisms which are not compatible with multimedia use. It is anticipated that as the importance of multimedia increases that these multimedia limitations will be eliminated.

4.4 Unsubscribe from Future Delivery

A preferred option of the message delivery system is that of "unsubscribe" wherein the message recipient can opt-out of future multimedia messages from the client. "Unsubscribe" may be implemented either with the outbound mail message or with text that instructs the recipient on the opt-out procedure. In either case the unsubscribe response is logged upon receipt and can be used to automatically create a "non-participant" table of parties that are not to be included in future campaigns. The normal campaign reporting mechanisms preferably include reports of the number and percentage of "non-participants".

4.5 Optional Email COM Object

Figure 15:
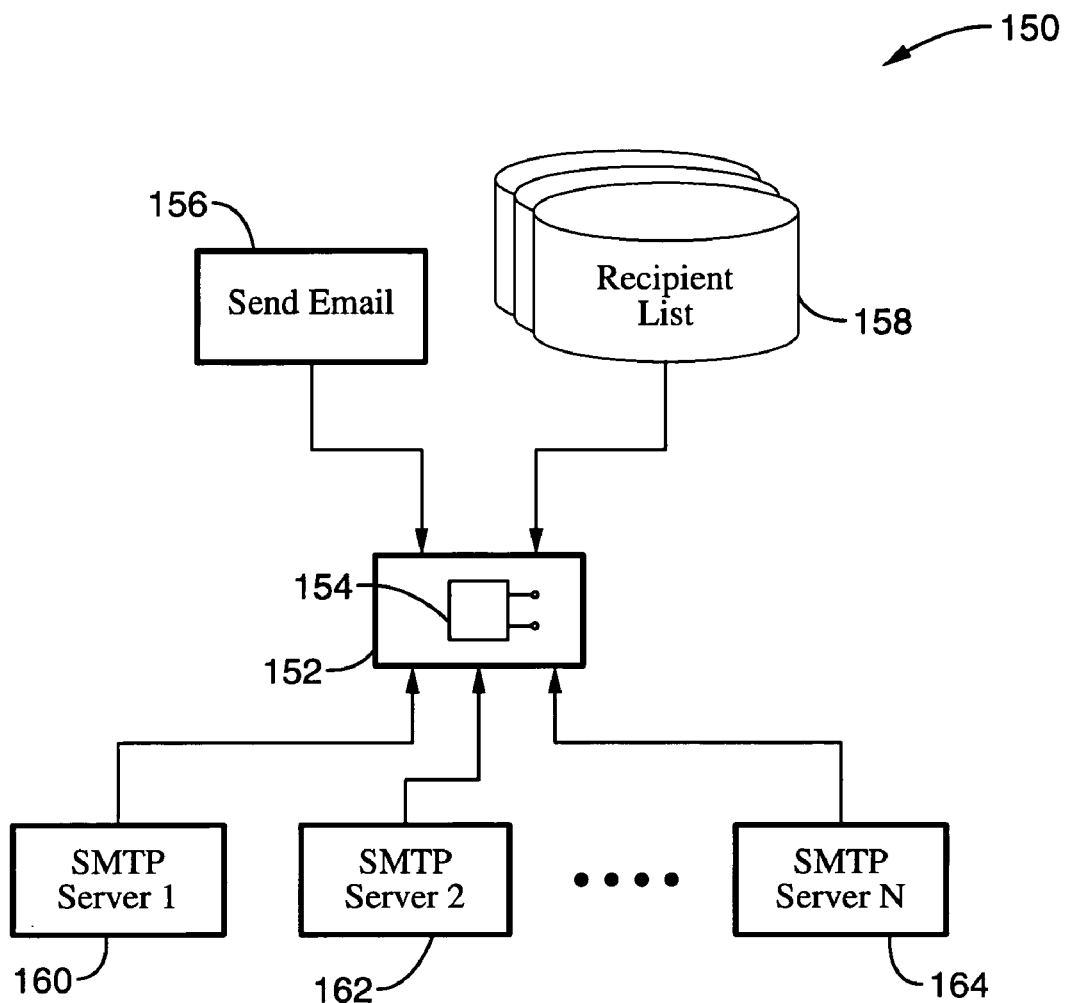
FIG. 15 is a block diagram of a dedicated server configured as an email engine containing a COM object according to an aspect of the present invention which is shown delivering email messages to dedicated outgoing mail servers.

Emails which have been created by the multimedia engine and contain an individualized multimedia message may be delivered through various delivery structures. One such alternative delivery mechanism is the use of dedicated servers which provide "email engines" for dispatching emails. Preferably the dedicated email engine is configured with a COM object for processing emails. Once installed on a server, the COM object is called from the multimedia messaging system to execute and process emails for a given campaign. The COM object is a proprietary, custom ActiveX DLL which provides what could generally be considered a feature rich packaging and delivery method for the emails which have been created by the multimedia engine. The COM object provides the capability to generate email in batches, to measure email dispatches, along with the advantages of dispatch scalability and balancing. FIG. 15 shows an embodiment 150 of a dedicated server 152 configured as an email engine and containing a COM object 154. The delivery of email is controlled through an interface 156, which is preferably implemented as an active server page for controlling the delivery options and may be implemented as a separate page, or as added fields to an existing control page. The COM object operates from data provided by the system 158, and dispatches emails into conventional SMTP servers 160, 162, 164 which are queued up and subsequently delivered to the recipients.

4.5.1 Text Changing within Email Engine

The COM object also provides the capability to add/change text within the individualized emails prior to delivery. The ability to modify text allows for further customization to be performed near the point of delivery. For example, text can be added to messages which will be directed to servers which currently do not support HTML emails, such as internet service provider AOL™, so that a textual directive appears for the recipient to click on the link or URL. It will be recognized that the domain name associated with email destinations, such as AOL™, can often be used to infer what level of email capability exists therein.

4.5.2 Operation of COM Object

The COM object within the email engine operates by using ADO to link back to the clients data within the multimedia messaging system. The COM object processes the emails contained within a list of email messages that each may comprise text and HTML components. Messages from the list are preferably saved in batches in a queue directory, that for instance may contain 1,000 email files. The emails are popped from the queue and moved to a designated destination directory which would typically be an outgoing mail server, such as a dedicated SMTP server.

4.5.3 Stored Procedures

Furthermore, the COM object operates in concert with various stored procedures and dedicated tables maintained by the system. For example, procedures are provided which perform data collection on aspects of the delivery process for the tracking and reporting subsystem. Specifically, stored procedures track details of the email batch processing such as date/time, number of mails processed, processing time, e-mails/sec processing rate, and the tracking of when messages are sent.

4.5.4 Delivery in Batches

The described architecture in conjunction with the use of batches enhances server performance and permits scalability. The size of the batch is configured to keep the ADO record set small while providing the capability to "throttle" delivery processing by sequentially creating and moving messages to the final destination directory. As implemented on the present system a batch count of about 1,000 was found to be suitable. The limited batch size helps prevent SMTP server overloading, as it allows sending a batch of 1,000 messages while another 1,000 messages are being prepared. By utilizing the batch mechanism, message delivery can be linearly scaled by adding additional servers.

4.5.5 Use of COM+

Alternatively, a COM+ object, may be utilized within the email engine instead of the COM object, so as to provide for pooling and load balancing from the COM+ services which would be installed on the server of the email engine. Using the COM+ object in this way provides a mechanism for managed resource threading wherein multiple campaigns may be run concurrently.

4.5.6 Optional Features

Numerous additional optional features can be provided to boost performance, or for supporting specific application needs, which include: deferred mailing; multiple destination directories to speed delivery of campaigns; intelligent load balancing based on mail server query functions; and the use of multiple email engines and load balancing therein.

5. Reporting and Tracking

Reports can be provided periodically and in real time. Reports can be sent out on a periodic basis, such as with client billing statements. In addition, a URL link can be provided to the client to allow instant, real-time access to the reports wherein clients can view the results of a campaign while it is underway. Reporting is provided on systems deployed by the client, or for ASP deployment, and is preferably exportable to native client format so that the results may be imported to the client systems for their own data analysis. Reports provide information on the number of messages created, number of messages sent out, date and time of stream playback, number of recipients opening the message, number that access the playback site (if not automatically activated), number of recipients sending the message to another party, time between message dispatch and recipient opening the message, interaction time of recipient (average, range), participation rate, click history within the message, click-throughs to site, comparative reporting across various campaigns, or tests. Reports additionally should provide subtotals of data by parameter; such as how often character "X" was selected as a percent of the total, or how often parameter "Y" was stipulated. The reports preferably allow a date/time range to be defined which is to be covered within the report.

5.1 Standard Reports

The questions answered by the standard reports and custom reports is exemplified as follows:

How many times users click in order to forward a message (average, range)

How many .SWF files are pulled (i.e. total number of streams)

How many emails are sent by Multimedia Engine (total, by time interval)

Unique senders (according to unique email addresses)

Unique receivers (according to unique email addresses)

Click-throughs from users to the client-hosted pages

Click-throughs from the hosted pages to client

Time between message dispatch and recipient access for playback

Duration of time spent at site while generating a message (average, range)

Duration of time spent at site while retrieving a message (average, range)

Date and time of message dispatch (histogram)

Date and time of message playback (histogram)

Number of messages sent per unique sender (chart of average, range)

5.2 Custom Reports

It will be appreciated that a "custom" report by its nature is driven by a specialized client need. It will be appreciated that any operation involving the campaign database can be tracked. Therefore, the following custom reports are provided by way of example only:

Messages outstanding (emails sent out without corresponding .SWFs pulled)

Average time a user spends preparing a message.

6. Batch Mode Interface

The multimedia messaging system provides the capability to deliver individualized messages to any sized list of recipients. However, the previous description has largely focused on a client interface for large advertising campaigns, wherein the system was preferably hosted on a client computer and accessed by a custom browser. The system also provides a batch mode interface that is directed at the deployment of small message batches, and even messages directed to individual recipients. The term "batch mode" as used in reference to campaign size refers to the delivery of messages to a small list of recipients, typically ranging from one up to a few thousand. The operation of the batch mode primarily differs from those of a campaign mode in that the number of recipients is generally less while the amount of information and the interaction between client and recipient is greatly increased, as is the control of delivery time and options. Furthermore, batch mode messaging is often event driven, that is in response to a status change, such as reflected by entry changes in a database. Preferably, the multimedia messaging system is hosted as a web site by an application service provider in supporting batch mode operations. Two examples of event driven batch mode are: when a backordered item is received for customer pick-up, or when it is calculated that a particular vehicle of a customer is due for an oil-change. However, the individualized messaging can also be initiated manually, for example, by a salesman to provide more effective communication with individuals on a client or prospect list. In transmitting these small batches of messages, the client is allowed to control the variables contained within each message, and the transmission variables, such as send time. By way of example, the batch mode capability allows a company to provide individualized customer notices, appointment scheduling, invoicing, billing, and so forth. In addition, it should also be appreciated that the output of these multimedia messages may take the aforementioned message forms, which include email, interactive messages, non-interactive messages, file downloads, and print media. It will be appreciated that the system and method according to this aspect of the present invention has wide application for businesses including those involved in the retail, service, or business to business segments.

6.1 Batch Mode Features

- Client selection of message template for message batch
- Template can include multiple individualization elements (graphics, audio, text, file attachments)
- Messages provided with both a male and female voice option
- All sender message information (to, from, subject, text) can be recalled for future use and review
- Message tracking and reporting mechanism built into the interface
- Batch upload mechanism imports data from typical data formats (including: *.csv, *.xls, *.txt)
- Sender has option to "bcc" self (or designated box) for all messages
- Sender has option to preview messages

6.2 Customer Benefits

- No large investment necessary, client may pay by subscription fees
- Provides repository for campaign messages
- Provides mechanism to conduct rich media test marketing
- Provides mechanism for true one to one rich media email marketing
- Allows clients to empower direct sales forces with individualized rich media messages to communicate with prospective customers
- "Ready Made" content provides access to individualized rich media email marketing campaigns for small businesses

6.3 Batch Mode Options

A dynamic vault option provides client space for storing rich media campaigns which may be accessed for future campaigns and/or test marketing purposes. Preferably, a flat monthly subscription rate would be collected which is based on the number of messages archived and a maximum number of transmissions/month.

A dynamic sales tool allows clients to empower their direct sales force with individualized messaging technology. Message templates and content banks are established that allow sales forces to communicate in a highly personalized and relevant fashion to each prospect, on both a one to one and batch basis. Preferably the service would be billed at a monthly subscription fee.

A ready made content tool allows small businesses to use predefined templates and content banks to transmit relatively small email marketing campaigns. Templates and content banks are established for identified vertical industries (e.g. travel). Customers can upload databases into the system, have data analyzed to determine the extent of name bank matching, transmit data, and track campaign performance.

7. Multimedia Code Library

The multimedia engine makes use of a code library and rule set within the system to integrate client information, multimedia content, and recipient data during the creation of individualized messages. The following is a list of code library files which are provided within a preferred embodiment of the invention:

Final.fla—the base Flash source file for the campaign. (Flash 5 format)

alt.asp—the container for the final Flash campaign as seen in the browser alt.fla—the Flash 5 source file for alt.swf.

alt.swf—a redirection *.swf file that is embedded in link.asp, redirects browser window to alt.asp.

conn.inc—an include file that contains the ODBC info for the campaign, and is referenced in link.asp.

F3movie.fla—the Flash source files for F3movie.swf.

F3movie.swf—a single frame Flash movie which displays a message to the user suggesting that they upgrade their Flash plug-in. This movie is loaded by the "swiffer" routine in final.fla.

fallout.asp—an HTML page that the user without the Flash plug-in is taken to. This page contains fallthrough.gif, as well as links to Macromedia (for Flash download) and a link back to link.asp to view the Flash content after the user has downloaded the plug-in.

fallthrough.psd—the ImageReady source file for fallthrough.gif.

fallthrough.gif—a graphic that appears in fallout.asp. This may be a static version of the campaign or a message to the user to upgrade their Flash plug-in.

link.asp—This file receives the variable msgid from an email template link, looks up and retrieves the applicable variables from the campaign data base and passes them to alt.swf. This file also causes redirection, using and HTML Meta tag, to fallout.asp in the event that the user does not have the Flash plug-in and has therefore not been redirected by alt.swf to alt.asp.

template.html—an HTML template to temporarily test final.swf.

interface.html—a test file for setting variables and sending them to theemailer.asp.

theemailer.asp—a test file for mailing a campaign.

time.asp—an asp file for calculating and returning values of date and time.

8. Data Quality

The system is required to interface with the recipient databases of various clients. Each of these client databases may contain errors, and data issues which should be resolved prior to using the data within the campaign. The preferred embodiment of the invention comprises routines that are capable of operating on the recipient database to minimize the errors and to resolve data issues. The type of error, or data issue, that may need to be resolved within the database can depend on the information being extracted from the database and the structure of the target database. One of the more common errors is that of duplicate names. In addition, a major data issue is that of determining which of multiple redundant fields, such as email address, are to be used.

The exemplified embodiment optionally provides the following five step process to ensure the quality of recipient information and email addresses:
1. Import raw customer list into a table
2. Names cleanup:
   Get rid of leading and trailing spaces
   Replace multiple spaces with a single space
   Replace "&" with "AND" within the names
   Capitalize the first letter of each portion of the name
   Remove all single character names
   Change spaces to under score
3. Email Cleanup:
   Get rid of leading and trailing spaces
   Remove spaces in fields
   Remove entries without @ (save them in another table)
   Identify mail without ".", attempt repair or remove
4. Parameter values:
   Generate values for pn1 using "SoundsLikeNames"
   Generate values for all p? parameter based on campaign criteria
   Generate unique FlashURL for the message
5. Generate Customer List Statistics:
   Total number of recipients
   Determine number without names
   Determine number of names with no audio
   Determine number of names with audio To better understand the problems encountered with data quality, Table 2 has been provided to illustrate a hypothetical portion of a recipient list containing a few common errors. Due to the number of fields within the list, it has been divided into a part A and a part B, wherein an equal reference number (first field from left) denotes an identical entry. The routine operates on information provided by the client to resolve various errors and issues. For example: Are record numbers 1 and 2 duplicates? Should the duplicate be eliminated? Are records 1, 2, and 3 all duplicates? Are records 1-4 duplicates? How many messages are to be sent? Should email #1, or email #2 be used for addressing the messages? In addition, the routine can check for typos, such as a first name of "Johm" which is more likely "John", or incorrect ISP extensions, such as "yahooo.com" instead of "yahoo.com". At the discretion of the client, these items can be either flagged, or automatically corrected. The routine can thereby provide "cleaned up" databases back to the client as a value-added service.

9. Word-of-Mouth ("Viral") Advertising

The multimedia messaging system provides new methods of using word-of-mouth advertising, which is also commonly referred to as viral advertising. The practice of "viral advertising", or "word-of-mouth advertising", refers generally to advertising in which recipients of an advertisement for a product subsequently advertise the product within their own circle of acquaintances. Viral advertising has been employed with coupons, two-for-one deals, network marketing, and along with various conventional advertising. In "advertising" the product to a friend, coworker, or associate, the recipient would generally copy, or otherwise pass along the original advertisement. This, for example, can be performed with conventional printed advertising and email advertising.

However, it will be recognized that the relevance of advertisement passed into the recipients circle of friends is limited as the advertisement is not directed at that specific individual. The multimedia messaging system provides a form of viral marketing wherein the message passed by word-of-mouth may be individualized for each recipient to which it is passed.

The word-of-mouth, or viral messaging, provided by the system allows the recipient to direct the message to a friend, or associate, by entering information about that recipient and sending the message. For example, the message recipient can enter the first name and email address of a friend and click on the send button, which will send the message to that friend from that original recipient. The recipient can repeat that process indefinitely and each recipient has the opportunity to re-personalize the message and send it to additional friends, and associates. Various recipient information may required prior to sending the word-of-mouth message, the amount of information necessary being dependent on the particular message. Additional optional information may preferably be included within the re-created email. For instance, the message recipient can be allowed to add comments/testimonials about the product, or to customize the subject line to assure that the recipient recognizes the sender. Each recipient has the opportunity to re-personalize the message, and may enter in their own name as well. Other creative parameters (such as choosing the greeting to be added to the message) may also be entered. In addition, a large amount of creative individualization can be provided to allow the recipient to creatively build on the message; possibly to create a really "wild" message for their friend. The system also preferably allows the recipient to preview the new message before sending it to the friend, or associate. In addition, recipients of word-of-mouth advertising will be given the opportunity to opt-in to client lists.

The use of word-of-mouth advertising provides a number of benefits to both the client (advertiser) and the recipient (prospective customer). The scope and size of client's customer list may be expanded based on word-of-mouth recommendations. Each new recipient can have a unique experience as determined by the individualization performed by the sender. Prospects are expected to be more easily converted to customers since the message is made more responsive by the input of those that know that prospect better than the advertiser. Additionally, the client (advertiser) gains a mechanism for collecting additional information about recipients that may be used for additional campaigns in the future.

10. Transactional email

Typical email advertising campaigns provide a fixed message and do not provide simple mechanisms for the recipient to respond to the ad or to get additional information. Conventional email advertising requires the recipient to access a website to receive additional information or to place an order. The recipient is thereby required to shift from the mail program to their browser in order to go and access the website, and then they must wait for the website to load. These inconveniences should make the use of transactional email on the multimedia messaging system very attractive to both recipients and advertisers.

In contrast to conventional email advertising, the use of transactional email allows the recipient to collect additional information and to make purchases directly from within the email message. In addition, the message can be further individualized in response to recipient selections, whereas the recipient can retrieve information quickly without the need of browsing through numerous pages within a site.

To provide a transactional email message, an email message containing the unique URL link is sent to the recipient. The individualized message that is provided to the recipient upon email access preferably contains an order button, and/or additional selections to allow the recipient to selectively gather additional information. Upon clicking on the order button, an order message is created that may be filled in by the recipient. It should be further appreciated that the message can be created with numerous client related fields already filled out, such as name, address, phone number, and so forth. Having the fields already filled out simplifies the order process for the recipient while it additionally provides corrected information about the recipient back to the advertiser.

11. Variable Discounts and Coupons

Conventional inducements to order a product or service provide a fixed discount, or offer, on a particular product. The multimedia messaging system, by contrast, provides the ability to provide variable discounts with individualized items as well as individualized coupons and rebates. The variable discounts can provide a campaign with an "impulse buy" element. These variable discounts can be changed "live" during the campaign in response not only to recipient information and on-line selections but also to the actual order rates of the various products. Typical advertisers generally must guess at order rates and pricing which is reflected in excess inventory, or sacrificed profits. This "live" pricing capability for example can be used by a merchant to more readily turn over their inventory. The merchant can establish the price of items based on a formula that takes supply and an inverse relationship to order rate into account. By adjusting the prices according to stock and order rate all items can be "moved" more effectively without having to sacrifice profits.

Another factor in setting merchant pricing can be timeliness, by the use of offers that expire or more preferably change, or morph, with respect to time. This method of offering discounts builds extra incentives into the campaign.

The variable discounts also allow the merchant to perform "live" testing of offers. For example it may be discovered by "live" testing of two discounts that the 25% off discount provides double the order rate of the 20% discount. In this way the advertiser can create a campaign which contains "live" testing built into the campaign.

12. Site Implementation

The multimedia messaging system of the present invention may be implemented by integrating suitable off-the-shelf computer and network equipment with application software of the multimedia messaging system. The features and functions of the system are provided within this embodiment by software that is executed on the computer/s within the system. It will be appreciated that the system may be implemented with various forms of hardware and connected in a variety of ways.

12.1 Implementation Considerations

To assure proper implementation of the multimedia messaging system the following considerations were taken into account:

1. Delivery—Optimal delivery of multimedia content over a network, wherein the nature of content and the format is suitable for each recipient
2. Performance—Message playback begins within seconds of recipient access
3. Scalability—Facile addition of streaming capacity and bandwidth as required
4. Reliability—Campaign execution and message delivery 24 hours a day, 365 days a year
5. Reporting—Providing accurate and continually available performance statistics on campaigns
6. Interoperability—The ability of the multimedia messaging method and system to be executed over various networks, along with multiple platforms and operating systems

12.2 Specific Hardware Implementation

A system was implemented using web servers running on Compaq™ 1850R machines, with Windows NT 4.0™ and IIS 4™ installed. Each machine preferably provides high-speed dual processors, dual network interface cards, at least 256 MB of RAM, and at least 18.2 GB of disk storage on a RAID 5™ system. The databases are hosted using SQL 7 Enterprise edition from Microsoft. These preferably are arranged in an active/passive cluster configuration to provide total redundancy. The site-reporting server for the system runs on an HP LPr Netserver. Reporting software from Web Trends provides for the generation and analyzing of site activity. The system is interconnected using a 10BaseT connection to the Internet, and Cisco's PIX firewalls for security and Cisco's LocalDirector™ for load balancing of traffic among the servers. Website connection is provided using Cisco routers and a T1 connection, which is used primarily for site updates and remote management.

The bandwidth of the site currently supports only support 750 concurrent sessions at any given time. Since 30-40 second AIF clip run about 500 kb, the base bandwidth needed to stream this files is 12.5 kb per second. The current amount of bandwidth is burstable to 10 mb. This burst capacity supports 10 mb/12.5k b or 800 streams.

12.3 Results from Load Testing

Initial stress testing indicates that up to approximately 700 concurrent connections may be provided by the system before errors begin to occur. During this testing, hardware errors have been found to be the current limitation and the cause of the load testing errors. Using enhanced hardware configurations the application has actually been demonstrated to provide over 1,000 concurrent sessions per server.

13. Capacity Considerations

The architecture of a specific installation is determined in large part by the anticipated traffic and the intended utilization of the system. The following discussion is based on the assumption of a 5 million (M) message campaign deployed across the continental United States.

It is estimated that 95% of email recipients check their email within 48 hours, with 70% of that number checking within 24 hours. Typically, morning and evening are the two main peak periods when people check their email. Taking into account time zones, it has been determined that of the 70% who check their email within the first 24 hours from receipt, 20% check their mail in the morning and 65% check their mail in the evening; with the remaining 15% checking their email throughout the day.

Thus the peak periods are three hours in the morning; three to four hours in the evening, and a smaller percentage scattered throughout the rest of the workday. Based upon the above assumptions, the following conclusions about traffic for a campaign of 5 M messages sent overnight were determined:

4.5 M return within 48 hours
3.15 M return within 24 hours, with:
  Morning—630 k
  Evening—2.475 M
  Other—472 k From the foregoing discussion, it is apparent that about 2.475 M returns can be expected in an evening after a campaign is delivered. On a per minute basis, therefore, the system must accommodate 7,500 users at any given time during the evening rush hours. The system, therefore, would preferably be configured to accommodate 7,500 streams with each stream running about 12.5 k. This requires a bandwidth of about 113 mb; which slightly exceeds the capacity of 100base-T. To provide for normal HTTP traffic over the network, an additional 10 mb is added to raise the bandwidth to 123 mb.

13.1 Estimating SMTP Server Requirements

It has been determined that a single computer running dual 500 mhz processors can send 1,000 emails per minute, or roughly 60,000 emails an hour. Therefore, in order to send out a 5 M email mailing we would need:

100 computers for 1 hour, or
50 computers for 2 hours, or
25 computers for 4 hours, or
12 computers for 8 hours 13.2 Scalability Issues The multimedia messaging system has a scalable architecture which allows the system to be scaled by the addition of servers to provide any desired level of throughput. The architecture itself is capable of handling 128 Gigabytes of throughput or 96 million packets per second. The main chassis should accommodate up to 384 100base-T computers plus 96 gigabit channels, which would be sufficient to support the planned architecture. Any necessary throughput increase can be met by the simple addition of more machines above aforementioned 384 computers.

13.3 Security

The system preferably provides redundant security for the database and the primary firewalls to assure state-of-the-art data protection. The system preferably utilizes Cisco's PIX firewalls to control access to the network and servers.

14. Business Model

The multimedia messaging system of the present invention may be variously deployed for use by clients developing and launching individualized multimedia campaigns. As already described, clients may access the multimedia messaging system of the present invention to develop their campaign. Development access being preferably through a communication link, such as over a network. In addition, the multimedia messaging system may be sold or licensed to clients as software, or a combination of software and hardware. The company (owner of the rights to the multimedia messaging system) may additionally provide development services, in full or in part, to facilitate campaign development. By way of example, a corporation having a large ecommerce site may pay the company to license the software and then pay the company or a third-party integrator to incorporate the software into their corporate systems.

Revenue collection models have been developed for this system that have not been available in previous email campaigns. It will be recognized that in undertaking a typical email campaign, a single message is created and then a mail program is used to bulk mail the message to a list of recipients. One preferred business method for the individualization services is to collect a fee for each individualized message that is delivered. In this way the client need not pay for individualization of each email, as a substantial percentage of the emails may be discarded without being opened. This approach can simplify marketing of the service as the client pays only for those emails which are opened by the recipient such that the individualized message was played. The development resources used by the client in developing the campaign may be offset by the payment of client fees. Alternatively, the fees may be charged only for campaigns that do not exceed a predetermined size, or be prorated. In addition, development fees may be based fully, or in part, on parameters of use, such as time, complexity, number of elements, media type, stream length, disk storage requirements, use of special services such as synchronization of media element, or combinations thereof.

15. Results from Campaign Trials

Campaign research was conducted using the multimedia messaging system to roughly determine the extent to which a campaign benefits from the increased relevance. In one trial, a video which is formatted in the Macromedia Flash™ file format was embedded in an on-line retailer's regular HTML newsletter mailing. As a part of the audio-visual content, the recipient was addressed by their first name and the message suggested a new line of golf clubs that would "help them become the greatest golfer in" New York, Seattle, or whatever city they were located in. In response to the newsletter, twenty-five percent of the users who received the individualized rich media versions of the message clicked through, and the per-customer acquisition cost was lower than in previous direct mail campaigns. Of 200,000 recipients of the email, 60,000 received the individualized message elements. These individualized newsletters sent to existing customers generated twice the amount of revenue per message sent and 30% more revenue per order than those messages sent without the personalized greeting.

Accordingly, it will be seen that this invention provides a system and method for providing multimedia content which is individualized for a particular recipient. It will be appreciated that the described embodiments are provided by way of example, as the messaging system of the present invention may be implemented on computer systems having various configurations and executing the described functions using a variety of software mechanisms, languages, and user interfaces. Furthermore, the exemplified architecture of the invention may be modified by one of ordinary skill in the art without departing from the teachings of the invention.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

System Elements

| ELEMENT | INPUT | OUTPUT | HW/SW |
|---|---|---|---|
| Client DB | | XML | SQL Server; ODBC Enabled DB |
| XML Transfer | ADO; XML DOM | XML | |
| Email Engine | CDO NTS; "Recipient Sniffer" | Email Transform Template; Java Applet; Other | Hawk Browser; MSMQ? |
| Content DB | .CSV; text; ODBC | ODBC | ASP; XML |
| Content Conversion | .wav | .swf | Flash |
| Log | Manual data entry | ODBC | SQL; ASP or Director |
| Client Admin | None for Version 1.0 | None for Version 1.0 | None for Version 1.0 |
| Multimedia Engine Admin | ODBC | Multimedia Engine Defined | Intranet |
| Search Criteria Archive/Storage | Literal | Literal | ODBC RAID |
| Design Envelope | Client defined | Client defined | Flash or Java |
| Delivery Mechanism | Client defined | Client defined | Flash or Java |
| Reporting | SQL Tables | Client Defined Parameters | Flash; Generator |

TABLE 2

Example of Data Quality Processing

Part A

| | Name | Address | City | ST |
|---|---|---|---|---|
| 1 | John Smith | 124 Oak St. #15 | Los Angeles | CA |
| 2 | Smith John | 124 Oak Ave. | Hollywood | |
| 3 | Lisa Smith | 124 Oak #15 | | CA |
| 4 | Yakima Canute | 124 Oak #10 | Los Angeles | CA |
| 5 | Johm Smith | 124 Oak St. | Hollywood | WI |

Part B

| | email #1 | email #2 | Acct # | Phone |
|---|---|---|---|---|
| 1 | john@yahoo.com | John@dino.com | 6001 | 3103491111 |
| 2 | john@yahoo.com | | 6001 | 8185551717 |
| 3 | john@yahoo.com | lisa@yahoo.com | 6006 | 3105551234 |
| 4 | | yakima@my.com | 8001 | |
| 5 | johnsm@yahoo.com | | 7501 | 7155552223 |

What is claimed is:

1. A system for creating and distributing a series of individualized multimedia messages over a computer network using an email message sent simultaneously to at least five hundred recipients, comprising:
   (a) a recipient information repository with unique recipient information for at least five hundred recipients;
   (b) a multimedia content repository with computer files comprising at least one of text and graphics files, and further comprising at least one of audio and video files; and
   (c) means for creating and delivering individualized multimedia content over said computer network including sending an email simultaneously to each of at least five hundred recipients, wherein said multimedia content is assembled from selected elements within the multimedia content repository which are selected in response to individual information about each of said recipients whose individual information is extracted from the recipient information repository and wherein at least some of said individualized multimedia content for said at least five hundred recipients are different from at least some other of said individualized multimedia content.

2. A system as recited in claim 1, wherein the means for creating and delivering individualized multimedia content over said network comprises a computer operatively coupled to said network for executing a programmed sequence of instructions which assemble said computer files from the multimedia content repository as selected according to said individual information about one of said recipients, as extracted from said recipient information repository, into a multimedia stream containing said computer files delivered to said recipient and wherein each said email message comprises multiple links, and the links for the email to at least some of said recipients are different from the links for at least some others of said recipients.

3. A system as recited in claim 1, wherein the unique individual information is contained within the at least one of audio and video files, and the at least one of text and graphics files and wherein the means for delivering the multimedia media message delivers the multimedia message to the email after one of the recipients opens the email.

4. A system for creating and delivering a series of individualized multimedia messages over a computer network using an email message sent simultaneously, comprising:
   means for accessing information about an intended recipient with unique recipient information for each of at least five hundred recipients;
   means for personalizing a multimedia message with computer files comprising at least one of text and graphics files and at least one of audio and video files for the intended recipient based upon information about a particular intended recipient; and
   means for delivering the multimedia message over the computer network to an intended recipient including sending an email message simultaneously to each of at least five hundred recipients, and wherein at least some of said individualized multimedia content for said at least five hundred recipients are different from at least some other of said individualized multimedia content.

5. A system as recited in claim 4, wherein the means for accessing information about an intended recipient comprises a data access routine within a programmed set of instructions being executed within a computer, the data access routine for manipulating a database, local or remote, to extract information about a recipient.

6. A system as recited in claim 5, further comprising an administration for monitoring and facilitating the creation of multimedia content within a multimedia campaign and includes routines of viewing/playing content, uploading content, searching content, and organizing multimedia content.

7. A system as recited in claim 6, wherein the administration routines are for creating and maintaining database and directory structures.

8. A system as recited in claim 6, further comprising file conversion routines for converting file formats within the system and for delivery to clients.

9. A system as recited in claim 6, further comprising a clean up routine for selective clean up of a recipient database by removing errors and unwanted redundancies.

10. A system as recited in claim 6, further comprising an archiving routine for saving files and associations within a particular campaign into an archive from which the campaign may be later restored and executed.

11. A system as recited in claim 4, wherein the means for personalizing the multimedia message for the intended recipient comprises a multimedia engine routine within a programmed set of instructions being executed within a computer, the multimedia engine routine for assembling multimedia elements from a content database into a multimedia message in response to information about the intended recipient and wherein each said email message comprises multiple links, and the links for the email to at least some of said recipients are different from the links for at least some others of said recipients.

12. A system as recited in claim 4, wherein the means for delivering individualized multimedia message content to the intended recipients, comprises a delivery routine within a programmed set of instructions being executed within a computer that is operatively connected to a computer network, the delivery routine for formatting the individualized multimedia message content for the intended recipient and for subsequently delivering the individualized multimedia message over the network for the intended recipient, wherein the message for the intended recipient may be delivered directly to the recipient, or delivered indirectly through one or more systems which direct the individualized multimedia message to the recipient and wherein each said email message comprises multiple links, and the links for the email to at least some of said recipients are different from the links for at least some others of said recipients.

13. A system as recited in claim 12, wherein the individualized multimedia message is delivered to each of the recipients as the email message which includes multimedia content having text and graphics files and at least one of video and audio files in a format selected from the group of multimedia formats consisting of Flash™, Real Audio™, Quick Time™, Windows MP™, SWF, SWT, Java™, HTML/Embedded, animated GIF, and 3D™.

14. A system as recited in claim 12, wherein the formatted individualized multimedia message is delivered to the recipient as the email message, and the message plays automatically when the recipient clicks on the message.

15. A system as recited in claim 14, wherein the individualized multimedia message is delivered to the recipient, comprising markup language coding into which multimedia elements are operatively linked to play as the markup language is executed.

16. A system as recited in claim 14, wherein the markup language coding is selected from the group of markup languages consisting of SGML, XML, and HTML.

17. A system as recited in claim 12, wherein the individualized multimedia message is formatted for delivery to the recipient with the email message containing a unique URL link for each of said recipients that when activated retrieves the individualized multimedia message content.

18. A system as recited in claim 17, wherein the activation of the unique URL link comprises execution of a first routine to collect individualized data and a second routine to display the individualized multimedia message content.

19. A system as recited in claim 12, wherein the individualized multimedia message is formatted for downloading to the recipient as a monolithic file, such as Flash™, Real Audio™, Quick Time™, Windows MP™, SWF, SWT, Java™, HTML/Embedded, animated GIF, 3D™, MPEG, MP4, or JPEG file, that may be either viewed or played by the recipient utilizing conventional players or viewers to access the message.

20. A system as recited in claim 12, wherein the individualized multimedia message may be converted to a format compatible with a graphic printer, such that individualized graphic output may be generated.

21. A system as recited in claim 4, wherein there is unique individual information contained within the at least one of audio and video files, and the at least one of text and graphics files and wherein the means for delivering the multimedia media message delivers the multimedia message to the email after one of the recipients opens the email.

22. A system for creating and distributing at least five hundred individualized multimedia messages over a computer network using an email sent simultaneously, comprising:
  (a) a computer operatively connected to said network and executing a programmed sequence of instructions;
  (b) a recipient information access routing within said programmed sequence of instructions for accessing data about a given intended recipient with unique recipient information for each of at least five hundred recipients;
  (c) a content repository containing multimedia elements that may be combined to form individualized messages with computer files comprising at least one of text and graphics files, and further comprising at least one of audio and video files;
  (d) a content management routine within said programmed sequence of instructions for retrieving selected multimedia content from the content repository, wherein the process of selecting multimedia content is responsive to information content regarding the given recipient accessed by the recipient information access routine;
  (e) a multimedia engine routine within said programmed sequence of instructions, for packaging the multimedia content as an individualized message for delivery to the given recipient; and
  (f) a delivery routine within said programmed sequence of instructions for delivering the individualized message to each of the given recipients including sending an email message simultaneously to each of at least five hundred recipients and wherein at least some of said individualized multimedia content for said at least five hundred recipients are different from at least some other of said individualized multimedia content.

23. A system as recited in claim 22, wherein the content repository comprises a structured database having a directory hierarchy.

24. A system as recited in claim 22, wherein the recipient information is accessed within said programmed sequence of instructions using SQL, SAP and XML.

25. A system as recited in claim 22, wherein the delivery routine is configured to deliver the multimedia message through a network for receipt on a media selected from the group of media consisting of email, WAP enabled devices, wireless devices, interactive TV, media files, and printed media.

26. A system as recited in claim 22, wherein the delivery routine prepares the multimedia content for delivery in a specific delivery format.

27. A system as recited in claim 26, wherein the delivery routine further comprises synchronization routines for synchronizing different multimedia streams, such as the synchronization of audio and video streams.

28. A system as recited in claim 26, wherein the delivery format provides a mechanism for servicing data queries.

29. A system as recited in claim 26, wherein the specific delivery format is selected from the group of delivery formats consisting of: Flash™, Real Audio™, Quick Time™, Windows MP™, SWF, SWT, Java™, HTML/Embedded, animated GIF, 3D™, and wireless.

30. A system as recited in claim 22, wherein the delivery format is capable of being converted for output to a printer so that the individualized multimedia message may be printed out as individualized graphics and text on a printing device.

31. A system as recited in claim 22, wherein the recipient information is extracted from a client database.

32. A system as recited in claim 22, wherein the multimedia messaging system is directly interfaced to the client system with a data exchange protocol through which the recipient information may be extracted and wherein each said email message comprises multiple links, and the links for the email to at least some of said recipients are different from the links for at least some others of said recipients.

33. A system as recited in claim 32, wherein the exchange protocol utilized is selected from a group of exchange protocols consisting of ODBC, and XML.

34. A system as recited in claim 32, wherein a custom interface is created for interfacing the multimedia messaging system with the client database.

35. A system as recited in claim 22, wherein the information about the intended recipient comprises a user name and an associated email address, so that the multimedia content may be customized with the user name and delivered to the email address of the recipient which is associated with the user name.

36. A system as recited in claim 22, wherein the delivery routine is configured to deliver the multimedia content to the intended recipient as an email message through a client routine that is supplied with data comprising the recipient's name, email address and a unique URL pointing to the message content, wherein the client routine is then capable of deploying the email message with the URL.

37. A system as recited in claim 36, wherein the delivery routine is further configured for delivery of the multimedia content to play spontaneously when highlighted within the recipient's email in-box.

38. A system as recited in claim 37, wherein the email messages are deployed within an email campaign, said email campaign comprising a content database, and a list of recipients with associated personalization information.

39. A system as recited in claim 38, further comprising an archiving routine for storing and retrieving email campaigns.

40. A system as recited in claim 39, wherein the archiving routine is capable of storing all files and structures relating to a specific campaign, such that a completed campaign that has been archived may later be restored for further development or use.

41. A system as noted in claim 36, wherein the unique URL is determined based on a prior unique URL for the same recipient and wherein the means for delivering the multimedia media message delivers the multimedia message to the email after one of the recipients opens the email.

42. A system as noted in claim 36, wherein the unique URL is correlated with unique content in the message for the same recipient and wherein in the step of delivering the multimedia message, it is delivered in response to opening the email.

43. A system as recited in claim 22, wherein the client interface of the content management routine comprises a graphical user interface which displays information and allows for direct client input.

44. A system as recited in claim 22, wherein the content management routine further comprises routines for directing content uploading, and the customization of the content database.

45. A system as recited in claim 22, wherein the content management routine further comprises routines for providing file security for a campaign which restricts non-authorized parties from accessing a client campaign.

46. A system as recited in claim 22, wherein the content management routine further comprises a comprehensive search engine for use on the content repository.

47. A system as recited in claim 22, wherein the search engine further comprises a Thesaurus that is capable of looking up files in response to a set of keywords.

48. A system as recited in claim 22, wherein the content management routine further comprises version control routines for managing file check-in and check-out by clients accessing the system.

49. A system as recited in claim 48, wherein labeling of a content element comprises adding a filename, description, and a keyword list.

50. A system as recited in claim 22, wherein each of the elements of content being uploaded is represented on a screen and each element may be labeled by the client.

51. A system as recited in claim 22, further comprising a reporting routine for real-time reporting of content and usage statistics.

52. A system as recited in claim 51, wherein the reporting routine is adapted for further providing information on click-rate, click-tracking, sales, customer profiles, and use patterns.

53. A system as recited in claim 22, wherein the multimedia content comprises graphics, animations, audio, and text which are utilized singly or in combinations thereof 54. A system as recited in claim 22, wherein the content management routine further comprises a routine for synchronizing combinations of graphics, audio, and text for presentation to the given recipient.

55. A system as recited in claim 22, wherein the multimedia engine routine further comprises a routine for modifying the individualized message content, such as the offer, discount, coupon, or rebate, after the campaign has been deployed, wherein individualized messages viewed or played after the modification will reflect the modifications.

56. A system as recited in claim 22, wherein the delivery routine further comprises a routine for collecting delivery and personal information about an additional recipient wherein the message may be re-individualized and delivered as word-of-mouth style advertising to the additional recipient.

57. A system as recited in claim 56, wherein the routine for collecting the delivery and personal information further collects optional information from the original recipient, such as recommendations, and an improved subject line.

58. A system as recited in claim 22, wherein the packaged multimedia content is delivered to the given recipient within an email message.

59. A system as recited in claim 22, wherein there is unique individual information contained within the at least one of audio and video files, and the at least one of text and graphics files and wherein the means for delivering the multimedia media message delivers the multimedia message to the email after one of the recipients opens the email.

60. A method of creating and distributing individualized multimedia messages over a computer network using an email message sent simultaneously to at least five hundred recipients, comprising:
- retrieving information about an intended message recipient from a recipient database using a computer;
- personalizing a multimedia message for each said recipient based on the retrieved information using a computer with unique recipient information for at least five hundred recipients and the multimedia message including computer files comprising at least one of text and graphics files, and further comprising at least one of audio and video files; and
- delivering, by using an email sent simultaneously to each of the at least five hundred recipients, the multimedia message to each of said recipients over a computer network and wherein at least some of said individualized multimedia content for said at least five hundred recipients are different from at least some other of said individualized multimedia content.

61. A method as recited in claim 60, wherein the information about the intended recipient comprises a user name and an associated email address and wherein each said email message comprises multiple links, and the links for the email to at least some of said recipients are different from the links for at least some others of said recipients.

62. A method as recited in claim 60, wherein the individualized multimedia message is assembled from multimedia segments which are selectably extracted from a content database after one of the recipients opens the email.

63. A method as recited in claim 60, further comprising providing the client with the ability to upload, search, and manage the multimedia content contained within the content database.

64. A method as recited in claim 60, further comprising providing the ability to archive email campaigns, which can later be restored for additional development or deployment.

65. A method as recited in claim 60, wherein the delivery of the multimedia message to said recipient is performed by sending emails to the recipients, wherein a unique URL is embedded in each email which points to stored message content, wherein upon the client opening the email the URL is activated and the individualized multimedia message is played for the client.

66. A method as recited in claim 65, wherein the email is delivered in a format capable of playing spontaneously when the email message is highlighted in the recipient's in-box or selected for opening.

67. A method as noted in claim 65, wherein the unique URL is determined based on a prior unique URL for the same recipient and wherein in the step of delivering the multimedia message, it is delivered in response to opening the email.

68. A method as noted in claim 65, wherein the unique URL is correlated with unique content in the message for the same recipient and wherein in the step of delivering the multimedia message, it is delivered in response to opening the email.

69. A method as recited in claim 60, wherein the delivery of the multimedia message to said recipient is performed by providing the client with the recipient's name, email address and a unique URL pointing to the message content, wherein the client then deploys the email message with the URL.

70. A method as recited in claim 60, further comprising providing a database structure and directory structure for retrieving and processing multimedia files to be used in an email campaign.

71. A method as noted in claim 60, wherein the unique recipient information is provided within the at least one of audio and video files and the at least one of text and graphics files and wherein in the step of delivering the multimedia message, it is delivered in response to opening the email.

* * * * *